(12) United States Patent  (10) Patent No.: US 7,596,385 B2
Aghvami et al.  (45) Date of Patent: Sep. 29, 2009

(54) METHOD OF DISCOVERING MULTI-MODE MOBILE TERMINALS

(75) Inventors: Abdol Hamid Aghvami, London (GB); Paul Anthony Pangalos, London (GB); Oliver Damian Holland, London (GB)

(73) Assignee: King's College London, London (GB)

( * ) Notice: Subject to any disclaimer, the term of this patent is extended or adjusted under 35 U.S.C. 154(b) by 565 days.

(21) Appl. No.: 11/337,208

(22) Filed: Jan. 20, 2006

(65) Prior Publication Data

US 2006/0166699 A1  Jul. 27, 2006

(30) Foreign Application Priority Data

Jan. 21, 2005  (GB)  ................................ 0501200.0

(51) Int. Cl.
 *H04M 1/00* (2006.01)
(52) U.S. Cl. ............... 455/552.1; 455/168.1; 455/414.1
(58) Field of Classification Search .............. 455/552.1, 455/433, 436, 437–439, 414.1, 168.1
 See application file for complete search history.

(56) References Cited

U.S. PATENT DOCUMENTS 6,377,804 B1   4/2002  Lintulampi
7,437,158 B2 * 10/2008  Russell .................... 455/435.2

FOREIGN PATENT DOCUMENTS

| EP | 1 347 614 A3 | 9/2004 |
| FR | 2857208 A1 | 1/2005 |
| WO | WO 00/74417 A1 | 12/2000 |

OTHER PUBLICATIONS

DVB Document A081, Digital Video Broadcasting, Transmission System for Handheld Terminals (DVB H), Jun. 2004, pp. 1-11.

European Standard (Telecommunications Series) Digital Video Broadcasting (DVB); Framing structure, channel coding and modulation for Digital Satellite News Gathering (DSNG) and other contribution applications by satellite, ETSI, EN 301 210 V1.1.1 (Mar. 1999), pp. 1-32.

GSM™ World, GSM Roaming, GSM Coverage Maps and Roaming Information, © GSM Association 2006, pp. 1-4.

(Continued)

*Primary Examiner*—Tony T Nguyen
(74) *Attorney, Agent, or Firm*—Kelley Drye & Warren LLP

(57) ABSTRACT

A method of discovering multi-mode mobile terminals (13) in a heterogeneous network environment, each multi-mode mobile terminal (13) having at least one interface for sending packet data to and/or receiving packet data from a home radio communication network (11) and a foreign radio communication network (12), said home radio communication network having a different access technology from said foreign radio communication network, each multi-mode mobile terminal (13) performing the steps of:

(a) listening to said foreign radio communication network (12);
 (b) receiving and storing a foreign network indicator for indicating presence of said foreign radio communication network (12); and
 (c) transmitting said foreign network indicator to said home radio communication network (11);
 whereby said home radio communication network (11) may store a database comprising a mapping between a multi-mode mobile terminal identity, a home network indicator and a foreign network indicator, to facilitate interworking of said home and foreign radio communication networks.

28 Claims, 15 Drawing Sheets

OTHER PUBLICATIONS

Hong, Xiaoyan, et al., "A Group Mobility Model for Ad Hoc Wireless Networks," Computer Science Department, University of California, Los Angeles, CA, pp. 1-8.

Devarapalli, Vijay, et al., "Network Mobility (NEMO) Basic Support Protocol, draft—ietf—nemo—basic—support—03.txt," NEMO Working Group, Internet Draft, Jun. 2004, pp. 1-39.

Johnson, D., et al., "Mobility Support In IPv6," Network Working Group, Jun. 2004, pp. 1-165.

Perkins, C., Ed., "IP Mobility Support for IPv4," Network Working Group, Jan. 2002, pp. 1-98.

R. Wakikawa, et al., "Basic Network Mobility Support," IETF draft-wakikawa-nemo-basic-00, Feb. 18, 2003.

E. Perera, et al., "Extended Network Mobility Support," IETF draft-perera-nemo-extended-00, Jul. 29, 2003.

C. Perkins, "IP Encapsulation Within IP," IETF RFC 2003, Oct. 1996.

C. Perkins, Standards Track, IP Mobility Support for IPv4, Nokia Research Center, The Internet Society (2002); pp. 1-99, Aug. 2002.

UK Patent Office Examination Report, pp. 1-2, Jan. 28, 2009.

* cited by examiner

METHOD OF DISCOVERING MULTI-MODE MOBILE TERMINALS

CROSS-REFERENCE TO RELATED APPLICATIONS

Priority is claimed under 35 U.S.C. §119 from UK Patent Application No. 0501200.0 filed Jan. 21$^{st}$ 2005, the disclosure of which is incorporated herein in its entirety by reference.

US GOVERNMENT RIGHTS

Not applicable.

FIELD OF THE INVENTION

The present invention relates to a method of discovering multi-mode mobile terminals in a heterogeneous network environment, to a radio communication network, to a computer program, to a computer program product and to a multi-mode mobile terminal.

BACKGROUND OF THE PRESENT INVENTION

The packet-switched domain of a radio communication network provides access for mobile terminals to external packet data networks such as the Internet; coverage is usually provided by means of a cellular structure. As mobile terminals move with the cellular coverage area the mobile terminals must be handed over from cell to cell if a session is to be preserved, each handover known as a horizontal handover. If the mobile terminals move from one radio communication network to another, handover can take place between the networks, known as a vertical handover. Handovers of both types should ideally take place with minimum disturbance of the user and of applications above the network layer (layer 3 OSI).

Current (and particularly future) radio communication environments comprise a number of different access technologies and different administrative domains in which the cellular coverage of one network overlays the cellular coverage of another; such an environment is herein referred to as a heterogeneous network environment. Mobile terminals, such as mobile phones, PDAs, and notebook computers, are being provided with the ability to connect to a number of different radio access networks to take advantage of the heterogeneous network environment. For example, a PDA may be provided with a WLAN interface for accessing computer networks, and a UMTS interface for making telephone calls and accessing the Internet. This functionality may be provided by a single re-configurable interface (e.g. with Software Defined Radio) or by physically separate interfaces. Such mobile terminals are referred to herein as multi-mode mobile terminals.

Each multi-mode mobile terminal (MMT) has a home network by which is meant that network providing a permanent point of contact for the MMT 13 e.g. by telephone number, network layer address (e.g. IP address) and may also be that network responsible for Authentication, Authorisation and Accounting (AAA), billing the user and storing user profiles for example. Usually the home network is also responsible for billing the user for access to the home network and any foreign network that the multi-mode mobile terminal uses.

Digital broadcast networks (such as American Television Standards Committee (ATSC), European Telecommunications Standards Institute Digital Video Broadcasting (DVB) and Digital Audio Broadcasting DAB, and Japanese Integrated Service Digital Broadcasting (ISDB)) are generally intended to offer point-to-multipoint unidirectional data transfer, although some schemes have been proposed for limited capacity data transfer from mobile terminals back to the broadcast network (for example DVB-Return Channel Terrestrial). Currently data is transmitted from a number of transmitters to provide coverage for a certain large geographical area (~80 km radius). Digital broadcast networks are characterised by high data transfer rates on the downlink. For example a DVB network may broadcast multiplexed data transmission streams at a rate of the order of tens of Mbps. In contrast, mobile cellular networks offer a point-to-point bi-directional voice and limited data service between terminals (either mobile of fixed). Data transfer rates in mobile cellular networks are generally lower than digital broadcast networks. For example IMT-2000 (e.g. UMTS) networks will offer a bandwidth of approximately 2 Mbps.

Attention has recently been turned to use of digital audio and video broadcast networks for transmission of datagrams. For example the DVB-Handheld (DVB-H) standard has been proposed to permit mobile terminals to receive data (e.g. Web pages and e-mails) from broadcast networks. The present DVB-H draft (document A081) is available at www.dvb.org. In the future it is expected that the number of broadcast transmitters will increase, with each having a smaller area of coverage. Thus the digital broadcast network is and will be cellular insofar as the total geographical area covered by the network is divided into a number of cells, each delimited by the area of coverage of one (or a few) transmitter(s).

With increasing popularity of multi-mode mobile terminals, it will be important that the different network providers co-operate to provide a seamless service from the perspective of the user. Accordingly it is envisaged that different networks in the heterogeneous network environment should inter-work to this end, and this is subject of on-going research and development.

One aim of the inter-working of the networks is to offer "seamless roaming" to users. This can be defined as the ability to reduce the effect that changes at the network level have on the end-user's perception of a service. Ideally, the end-user would not notice, and would not need to be informed, when service is handed over vertically. Heterogeneous Roaming Agreements (HRAs) between service providers and network operators will offer the user the ability roam over different network types and technologies (e.g. GPRS, UMTS, WLAN, DVB) under different administrative domains whilst paying only a single invoice, undergoing one authentication process, etc.

It is envisaged that in a heterogeneous network environment different networks will be able to co-operate to provide improved services to the user since their areas of coverage will overlap. "Load-balancing" between networks may be administered, such that e-mails may be delivered to a user through his home network, whilst an attachment to the e-mail is delivered over a foreign network for example; also requests for multimedia services may be sent over a home network, but the content delivered over a foreign network. In this scenario it is important for the foreign network to know details of the multi-mode terminal such as its MAC address, whereabouts and in which foreign network cell the multi-mode mobile terminal resides so that datagrams can be addressed, routed and filtered correctly.

Accordingly there is a need for a method of discovering multi-mode mobile terminals in a heterogeneous network environment, and in particular for a way for the home network to discover details of those other foreign networks that each terminal can access, such as network type, network operator code and current cell location data. Preferably, such a method would be able to discover the foreign networks that the multi-mode mobile terminal can access at that point in time, rather than simply receiving a list of the interface types thereon. Such a method would facilitate the interworking of networks, which is desirable as described above.

A yet further problem with which the present invention is concerned is radio resource management. Many terminal-related functions are commonly treated by mobile networks on a per-terminal basis. This is because the circumstances that mobile terminals experience, and the requirements for their operation (i.e. allocated channels etc), are often assumed to dynamically vary independently for all terminals. However, in group mobility scenarios, such as public transportation in a train or coach, a large number of terminals commonly experience the same dynamic fluctuations in conditions. These might include radio conditions (i.e. large-scale shadowing), resource availabilities, radio-service availabilities, cell handover times and histories, amongst others. In such cases, it would be useful for the system to be able to deal with these terminals as a group for the sake of efficiency, and for functions pertaining to the whole group to be performed for the group as one. For example, through improved algorithms for radio resource control, the system would be able to predict that a large number of terminals are about to enter a cell (and provision resources in advance accordingly) based on the knowledge of another known member of the group entering it. This would greatly improve the efficiency, and likely the reliability, of radio resource control. Enabling the system to recognise whether terminals are moving in a group is a challenge for a number of reasons, as information available to the system about the exact locations of terminals—aside from their current cell or location area—is often sparse.

In one aspect of the present invention this problem is addressed by a method that only requires a grouping entity to be informed about a new cell promptly upon the handover of each terminal, to detect groups of terminals that move together. Hence the method is generically applicable to a range of cellular systems, requiring no hardware additions, and is also extremely computationally simple and efficient.

Group handover methods have been investigated previously in cellular radio networks. WO 00/74417 discloses a cellular communications system in which group handover of a number of mobile stations from one type of network, such as UMTS, to another type of network, such as GSM, can be performed to relieve congestion in an overloaded cell. In one aspect mobile stations are grouped according to where they are located in a cell, with position being defined by signal power measurements. The power transmission level used by the base station is measured for each mobile station. The power level together with an identifier of the mobile station is sent to a grouping module that clusters mobile stations by power level into two groups using a predetermined threshold. When the cell becomes overloaded, the grouping module generates a handover instruction to all mobile stations in the first group to switch communication either to another frequency or to a different network. Whilst this is operable in a cellular communications environment (albeit between different generations) it is not clear how such a technique might work in a heterogeneous environment where there is limited communication and co-operation between different network types and operators at best.

SUMMARY OF THE PRESENT INVENTION

The present invention is based on the insight by the applicant that multi-mode mobile terminals can readily inform their home network of those foreign networks to which they can attach. The data gathered by the home network from multi-mode terminals can greatly facilitate interworking of networks and has a wide range of uses for both static and moving multi-mode mobile terminals.

According to the present invention there is provided a method of discovering multi-mode mobile terminals in a heterogeneous network environment, each multi-mode mobile terminal having at least one interface for sending packet data to and/or receiving packet data from a home radio communication network and a foreign radio communication network, said home radio communication network having a different access technology from said foreign radio communication network, each multi-mode mobile terminal performing the steps of:
  (a) listening to said foreign radio communication network;
  (b) receiving and storing a foreign network indicator for indicating presence of said foreign radio communication network; and
  (c) transmitting said foreign network indicator to said home radio communication network;
  whereby said home radio communication network may store a database comprising a mapping between a multi-mode mobile terminal identity, a home network indicator and a foreign network indicator, to facilitate interworking of said home and foreign radio communication networks. The foreign network indicator may be any data that can assist the home network in identifying multi-mode terminals. Preferably, however, the foreign network indicator enables the home network to identify the foreign network type and/or foreign network operator. To this end the foreign network indicator may be a network identifier e.g. SSID for a WLAN, SID for a cellular network and ONETID for a digital broadcast network. In this way the home network can discover multi-mode terminals and to which other networks each MMT has access. Furthermore the MMT may store some or all of the data broadcast by the foreign network; some or all of that data may be sent by the MMT to the home network. For example if the foreign network is a broadcast network that uses MPEG encoding (such as a DVB network) each MMT may receive and store the entire Network Information Table (NIT) and/or Program Association Table (PAT) and/or Program Map Tables broadcast with each transport stream used for carrying packet data; some or all of the NIT, PAT and/or PMTs may be transmitted by the MMT to the home network. In one aspect the foreign network indicator may comprise a Network Information Table (NIT); a Service List Descriptor; a Terrestrial Delivery System Descriptor; or a Frequency List Descriptor for example.

Access technology may be assessed on the basis of type of network, for example cellular, broadcast or wireless LAN (WLAN). Additionally or alternatively access technology may be assessed on the basis of the protocols employed at the physical layer for providing multiple access, for example Code Division Multiple Access (CDMA), Time Division Multiple Access (TDMA) or Frequency Division Multiple Access (FDMA). For example the home network might be an IMT-2000 type network and the foreign network might be a digital broadcast network such as DAB/DVB. The home and foreign networks might also be any IS-95 type network, a Wi-fi type network (e.g. under any of IEEE 802.11a/b/g standards) or Wi-Max (under the IEEE 802.16 standard).

Step (a) may be performed by tuning to a control channel of the foreign network. Gathering of the various foreign network indicators for each multi-mode mobile terminal has a wide number of uses to facilitate interworking, including: assisting vertical handover and load balancing between different networks; service delivery i.e. receiving a request for a service (e.g. a video clip) through the home network and delivering it through the foreign network; and network coverage: users that are able to listen to networks other than their home network effectively increase the coverage of the home network. For example, the multi-mode terminal may measure the RSSI for its home network and the RSSI for the or each foreign network to which it has access; if the RSSI for the or each foreign network indicates a better quality of service can be attained using the foreign network, the multi-mode terminal may inform the home network so that data can be delivered via the foreign network. It will be appreciated that this will have practical application near the limits of coverage of the home network: if the foreign network provides coverage in that area, the coverage of the home network can effectively be extended by delivering data using the foreign network. Particular advantages in signalling efficiency can be realised when the database is used to assist vertical group handovers and load balancing for both moving and static users. Step (c) may comprise the step of transmitting all of the data received from the foreign network to the home network; transmission of all of the data may take place only when the MMT issues a service request.

Advantageously, each multi-mode mobile terminal further performs the steps of receiving and storing a foreign location identifier representing its most recent location in said foreign radio communication network, and transmits said foreign location identifier to said home radio communication network, whereby for each multi-mode mobile terminal said home radio communication network may store a mapping between said foreign location identifier and a home location identifier representing its most recent location in said home radio communication network. The foreign and home location identifier may be a cell ID in the respective networks for example. This is particularly useful as the home network is then informed (and can be kept updated) with a mapping between the cell location of the MMT in the home network and the cell location in the foreign network. If load balancing is desired the home network can inform the foreign network which cell ID data should be transmitted from.

Preferably, each multi-mode mobile terminal further performs the step of transmitting said foreign location identifier to said home radio communication network following a change in location within said foreign radio communication network, whereby said home radio communication network may be kept substantially up to date with the location of each multi-mode mobile terminal in said foreign radio communication network. Once a particular service (e.g. Web browsing session) is underway, the MMT may be required to update the home network with changes in foreign network cell location as they occur.

Advantageously, the method further comprises the step of storing a location handover history in said database for each multi-mode mobile terminal, said location handover history comprising the home location identifier of a location where each multi-mode mobile terminal was previously located. Gathering and storage of this data enables an estimate of which MMTs are moving, and furthermore an estimate of which MMTs are moving together on a train or bus for example.

In one embodiment, at least five previous home location identifiers for each multi-mode mobile terminal are stored.

Preferably, said location handover history comprises for each multi-mode mobile terminal a time of handover between each location.

Advantageously, the method further comprises the step of using said database to handover service of at least one of said multi-mode mobile terminals from said home radio communication network to said foreign radio communication network.

Preferably, the method further comprises the step of defining at least one group of multi-mode mobile terminals in said database, said definition based on those multi mode mobile terminals that have the same foreign network indicator.

Advantageously, the method further comprises the step of defining at least one group of multi-mode mobile terminals in said database, said definition based on those multi mode mobile terminals that have the same foreign location identifier.

Preferably, the method further comprises the step of defining at least one group of multi-mode mobile terminals in said database, said definition based on those multi-mode terminals that have the same location handover history over the previous n location handovers, where n is greater than or equal to one.

In one embodiment, n is at least five. The applicant has found that this number produces good results in computer simulations of a simple hexagonal cellular network with a cell radius of approximately 100 m. It will be appreciated that the number of previous home location identifiers that are stored may vary as a function of the typical cell size of the home network.

Advantageously, the method further comprises the steps of, for each handover in said location handover history, determining those multi-mode mobile terminals that were handed over within a limited time period, only those multi-mode mobile terminals that have the same location handover history and that were handed over within said limited time period at each handover forming said at least one group. The end point of the time period may be that time when each MMT undergoes handover from one cell to another; in this way the grouping method is dynamic and groups are created, updated and removed at each handover of each MMT. Only those MMT that are handed over within a predetermined time before this point will be considered as part of the group. The time period need not be the same for each handover of the handover history.

Preferably, for a simple hexagonal cellular network with handovers triggered by Euclidean distances to base stations, said limited time period is less than six seconds. Again, it will be appreciated that this time may vary according to the size of the vehicle in which the MMTs are constrained, as well as characteristics such as shadowing, path loss, and interference for the wireless technology in question.

In one embodiment said home radio communication network has access to a database comprising a mapping between said foreign network indicator and a network layer address, the method further comprising the step of querying said database using said foreign network indicator to discover said network layer address, which network layer address provides a way for said home radio communication network to communicate substantially directly or indirectly with said foreign radio communication network. The network layer address may be an interface on a network node of said foreign radio communication network, or may be an interface on a network node external to the foreign radio communication network. If external, the network layer address may be of an interface on a SIP server for example. Accordingly, the network layer address may be an IP address or a URI for example. Using the foreign network indicator to look up the network layer address provides a convenient way for the home radio communication network to establish communication with the foreign radio communication network.

Advantageously, the method further comprises the step of handing over service from said home radio communication network to said foreign radio communication network for multi-mode mobile terminals of said at least one group. Handover may be desired for a number of reasons including more efficient use of network resources, load balancing, reduction of costs, reduction of signalling overhead for moving MMTs, etc.

Preferably, said handover step comprises the step of handing over a downlink only, whereby each multi-mode terminal of said at least one group uses an uplink of said home radio communication network and a downlink of said foreign radio communication network. In this way load balancing between networks may be improved. It will be appreciated that in certain circumstances it may be advantageous to hand over the uplink only so that each MMT uses the downlink provided by the home network and the uplink provided by the foreign network.

Advantageously, the method further comprises the step of said home radio communication network instructing multi-mode mobile terminals in said at least one group to relinquish communication therewith and to commence communication with said foreign radio communication network. The instruction may be generated and transmitted by a network node such as a gateway GPRS support node (GGSN) for example.

Preferably, said instructing step comprises the step of transmitting data with an instruction to enable each multi-mode mobile terminal to tune to the correct frequency and channel of the foreign radio communication network. This facilitates the handover process particularly if the MMT is switching to a uni-directional broadcast network where no uplink is available. In one embodiment the foreign radio communication network is a digital broadcast network (e.g. DVB) and the data comprises one or more Packet Identifier (PID) to enable the MMT to filter the correct Transmission Stream (TS) Logical Channel from the TS Multiplex.

Advantageously, the method further comprises the step of forwarding data packets arriving at said home radio communication network to said foreign radio communication network. If the home network uses IP, the data packets may be encapsulated in an IP header and tunnelled to the foreign network. The foreign network should then forward packets to the at least one group. Forwarding may be by way of unicast or multicast for example. In this way a service (such as delivery of multimedia content) is provided for the MMTs by the foreign network.

Preferably, the method further comprises the step of a first network node in said home radio communication network transmitting a group handover request message to a second network node on said foreign radio communication network, which group handover request comprises for each multi-mode mobile terminal in said at least one group: a first address of an interface for accessing said home radio communication network and a second address of an interface for accessing said foreign radio communication network, whereby said foreign radio communication network may store a mapping between an identity of each multi-mode mobile terminal and said two interfaces to facilitate routing of data packets arriving on said foreign radio communication network addressed to said first address. In one embodiment the first address is an IP address of a network interface on the MMT and the second address is one or more PID that the foreign network will use to forward the IP packets to the MMT.

Advantageously, the method further comprises the step of said foreign radio communication network storing a database comprising said mapping.

Preferably, steps (a), (b) and (c) are triggered when a multi-mode mobile terminal initiates a service. This might be when the user opens a Web browser or attempts to make a telephone call using Voice over IP for example.

Advantageously, said home radio communication network and said foreign radio communication network are both cellular in terms of coverage, each cell of said home radio communication network having a physical area of coverage less than each cell of said foreign radio communication network. This is particularly useful for handing over a group of moving users to a network with larger cells whereby horizontal handover frequency is reduced and load-balancing can be facilitated for example. Of course the opposite can be performed (i.e. larger to smaller) if a group of moving users come to halt.

Advantageously, said home radio communication network is a WLAN network, a mobile cellular network or a broadcast network.

Preferably, said foreign radio communication network is a WLAN network, a mobile cellular network or a broadcast network.

According to another aspect of the present invention there is provided a radio communication network comprising computer executable instructions for performing the method steps as set out above.

According to another aspect of the present invention there is provided a computer program comprising computer executable instructions for causing a home radio communication network to perform the home radio communication network method steps set out above. The instructions may be distributed over network nodes of a UMTS Core Network (e.g. HLR and GGSN for example).

According to another aspect of the present invention there is provided a computer program comprising computer executable instructions for causing a foreign radio communication network to perform the foreign radio communication network method steps set out above.

According to another aspect of the present invention there is provided a computer program product storing computer executable instructions as set out above.

Advantageously, the computer program product is embodied on a record medium, in a computer memory, in read-only memory or on an electrical carrier signal.

According to another aspect of the present invention there is provided a multi-mode mobile terminal comprising a memory storing computer executable instructions for performing the multi-mode mobile terminal method steps set out above. The computer executable instructions may be provided as a software update from the home network or may be installed during manufacture for example.

BRIEF DESCRIPTION OF THE FIGURES

For a better understanding of how the invention may be put into practice, a preferred embodiment of the invention applied in a heterogeneous network environment comprising a UMTS network and a DVB network will be described, by way of example only, to the accompanying drawings in which.

DETAILED DESCRIPTION OF THE PREFERRED EMBODIMENTS

Figure 1:
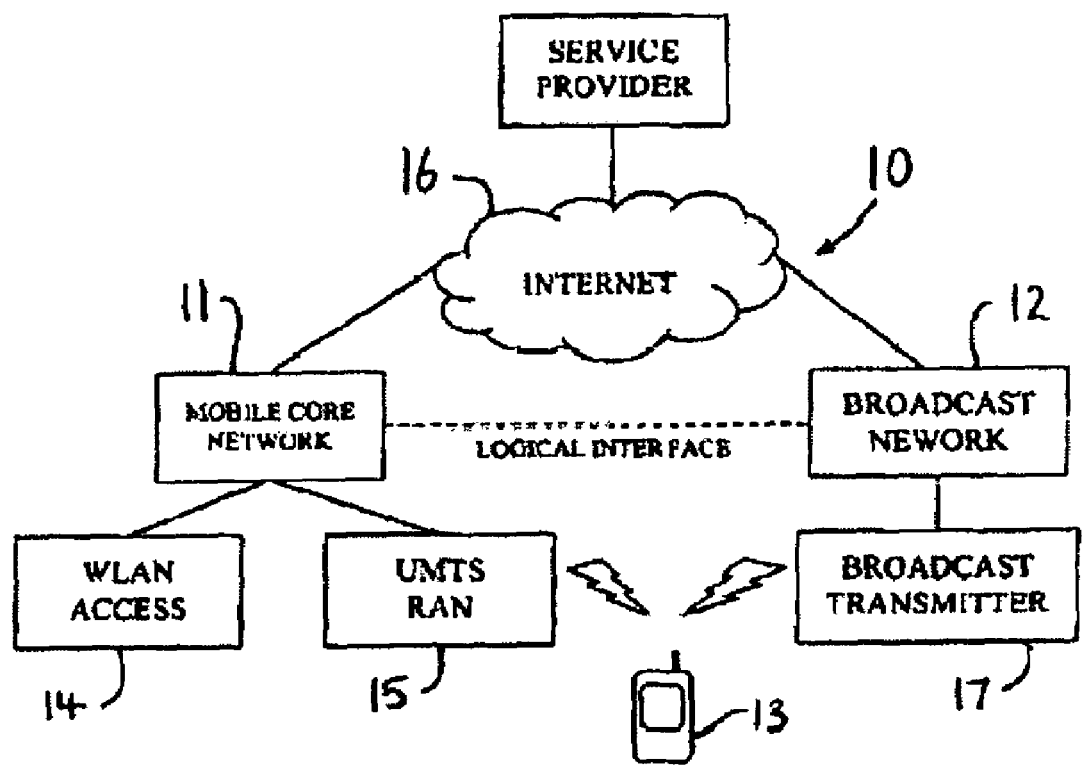
FIG. 1 is a schematic block diagram of a heterogeneous network environment comprising a mobile network and a broadcast network having a logical interface therebetween.

Referring to FIG. 1 a heterogeneous network generally identified by reference numeral 10 comprises a mobile network 11 and a broadcast network 12. Each of the two networks 11, 12 is under a different administrative domain and they are heterogeneous i.e. the protocols for access, transmission and/or handling of data is different between the networks. A Multi-mode Mobile Terminal (MMT) 13 has interfaces (or a single re-configurable interface) for accessing both of the networks 11, 12. The mobile network 11 is the home radio communication network of the MMT 13 i.e. that network providing a permanent point of contact for the MMT 13 e.g. by telephone number, network layer address (e.g. IP address) and may also be that network responsible for Authentication, Authorisation and Accounting (AAA), billing the user and storing user profiles for example. The broadcast network 12 may be considered a foreign radio communication network of the MMT 13 as it may only be used occasionally by the MMT 13. The mobile network 11 may provide access for the MMT 13 to packet-switched services over a wireless link via a wireless local area network 14 (WLAN) interface or via a UMTS radio access network (RAN) 15 interface for example. Depending on the service used by the user, packet data may be routed from the mobile network 11 to the Internet 16 or to another public land mobile network (PLMN), not shown. The broadcast network 12 is asymmetric in data transfer, and offers a much greater bandwidth on the downlink than on the uplink from the MMT 13. The same data is broadcast from a transmitter 17 for reception by a large number of MMTs in range of the transmitter 17.

MMTs 13 combined with the User Subscriber Identity Module (USIM) are referred to by the term "User Equipment" in UMTS terminology. However, throughout the present document the term "Mobile Terminal (MT)" is used generically to indicate such devices and any other wireless network access device. "Mobile Station (MS)", a term used in the context of GSM and GPRS networks, is equivalent to the User Equipment. The MMT 13 comprises a case housing a CPU, an interface, a memory (e.g. for example hard disk (e.g. solid state or magnetic disk), Random Access Memory (RAM), Read Only Memory (ROM)), a bi-directional transceiver BT (or interface) and a uni-directional transceiver UT (or interface). The BT and the UT are wired to an antenna for reception and transmission of data with the mobile network 11 and for reception of data from the broadcast network 12 respectively. The CPU interfaces with all of the aforementioned components to process (store, access, etc.) electronic data. The memory stores computer executable instructions that when executed by the CPU perform the MMT method steps described below. The computer executable instructions might be placed on the MMT 13 at point of manufacture; alternatively, they may be provided in the form of an upgrade from the home network i.e. the mobile network 11 in this case.

Figure 2:
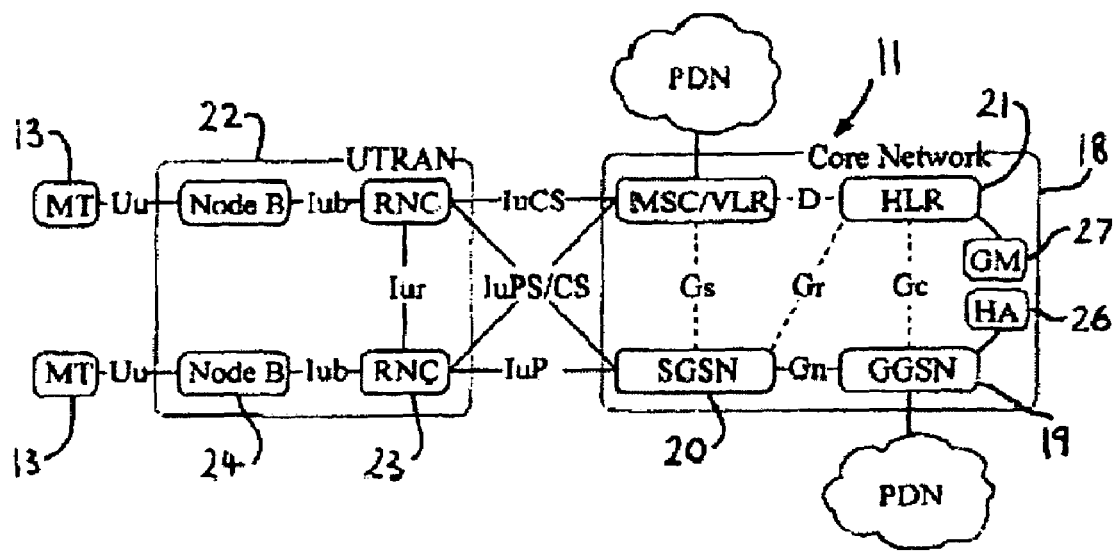
FIG. 2 is a schematic block diagram of part of an IMT-2000 UMTS network in accordance with the present invention and its connection to external packet data networks (PDNs)

Referring to FIG. 2 the mobile network 11 is shown in greater detail. In particular it comprises a PLMN that is divided into (a) the Core Network (CN) 18 comprising a gateway GPRS support node (GGSN) 19, a serving GPRS support node (SGSN) 20 and a Home Location Register (HLR) 21; and (b) the UMTS Terrestrial Radio Access Network (UTRAN) 22 comprising the radio network controller (RNC) 23 and Node B 24. The GSNs (i.e. the GGSN 18 and SGSN 19) constitute the backbone of the UMTS network 11. The UMTS network 11 forms a Public Land Mobile Network (PLMN) and each network operator (e.g. ORANGE®, VODAFONE®) owns and maintains a respective PLMN.

In use, each Node B 24 sends data to and receives data from MMTs 13 within a UMTS cell over a wireless link. Network operators generally model UMTS cells as hexagonal, although in principle any shape can be used. This permits the mobile network operator to plan network coverage over a geographical area by tessellating a plurality of UMTS cells. MMTs roaming within an area covered by a UMTS network can receive substantially seamless service through handoff between the UMTS cells. UMTS cells are typically of between approximately less than 1 km in radius and up to approximately 10 km in radius. Size is usually limited by the transmission power of the MMT 13.

The Gateway GPRS Support Node (GGSN) 19 is used as an interface from a cellular network to external Packet Data Networks (PDNS) 25. The PDN 25 may be the Internet 16 or a wide area network (WAN) for example, although in this particular case one of the PDNs is the broadcast network 12. The GGSN 19 maintains routing information required to tunnel user data packets to the SGSN 20 serving a particular subscriber. There is usually one GGSN per PLMN. Other functions include network and subscriber screening and address mapping. A Mobile IP logical entity called a Home Agent (HA) 26 is stored and operates on the GGSN 19, as described in greater detail below. A Grouping Module (GM) 27 is stored and operates on the HLR 21 as described in greater detail below.

Figure 3:
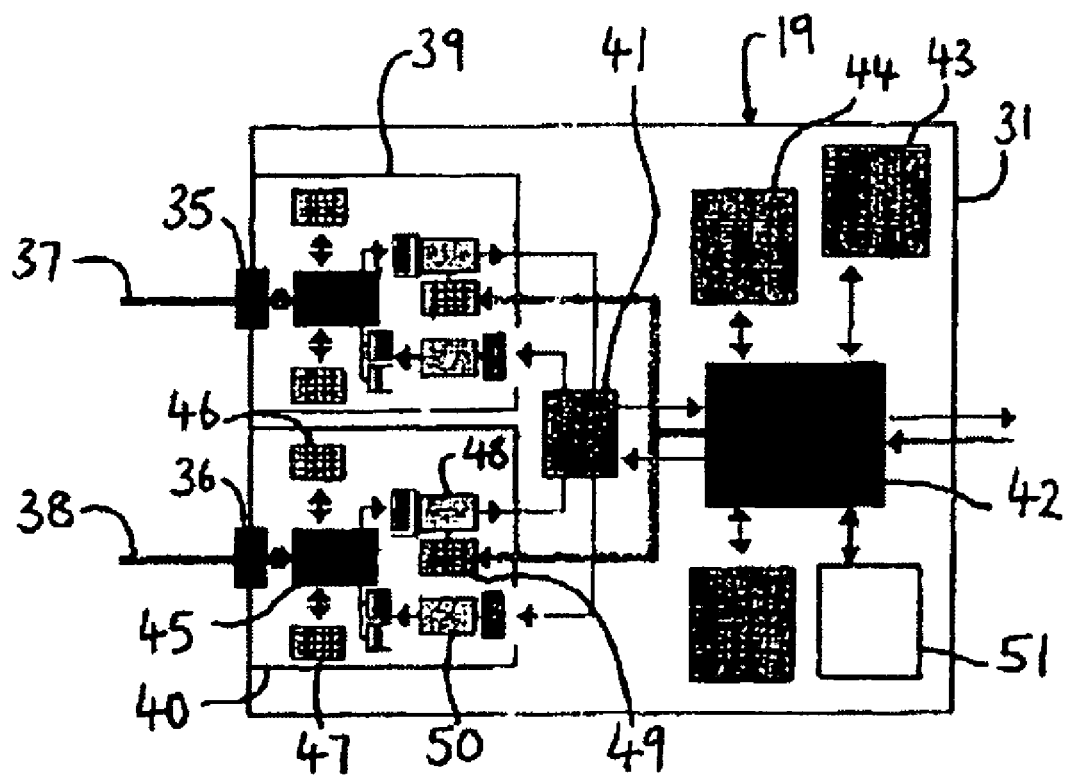
FIG. 3 is a schematic block diagram of a gateway GPRS support node (GGSN) in accordance with the present invention.

FIG. 3 shows the GGSN 19 in more detail that comprises a case 31 having network interface ports 35 and 36 to which respective cables 37 and 38 provide a physical link to an external network (e.g. PDN) and the UMTS network 11. Two network interface cards 39 and 40 are connected to their respective network interface ports 35 and 36. A hardware packet switch 41 connects the network interface cards 39, 40 and a central processing unit (CPU) 42 can communicate with a routing table 43 and router management tables 44. Each network interface card 39, 40 comprises a link layer protocol controller 45 that has access to an interface management table 46 and a hardware address table 47 (e.g. Address Resolution Protocol cache). In communication with the link protocol controller 45 is a network protocol-forwarding engine 48 having access to a forwarding table 49 (route cache), and an interface queue manager 50. Both the network protocol forwarding engine 48 and interface queue manager 50 have an interface to and from the packet switch 41 respectively.

In use, the GGSN 19 sends packets to and receives packets from various SGSNs (e.g. SGSN 20) and the various external PDNs as described above. An electronic memory 51 (e.g. RAM) stores computer executable instructions for performing the various GGSN method steps, and storing and operating the Home Agent 16. Various types of GPRS support node are available and the present invention is not limited to that described above. Further examples are available from Cisco Systems, Inc. (www.cisco.com), Siemens AG (www.siemens.com) and Alcatel (www.alcatel.com) for example.

Figure 4:
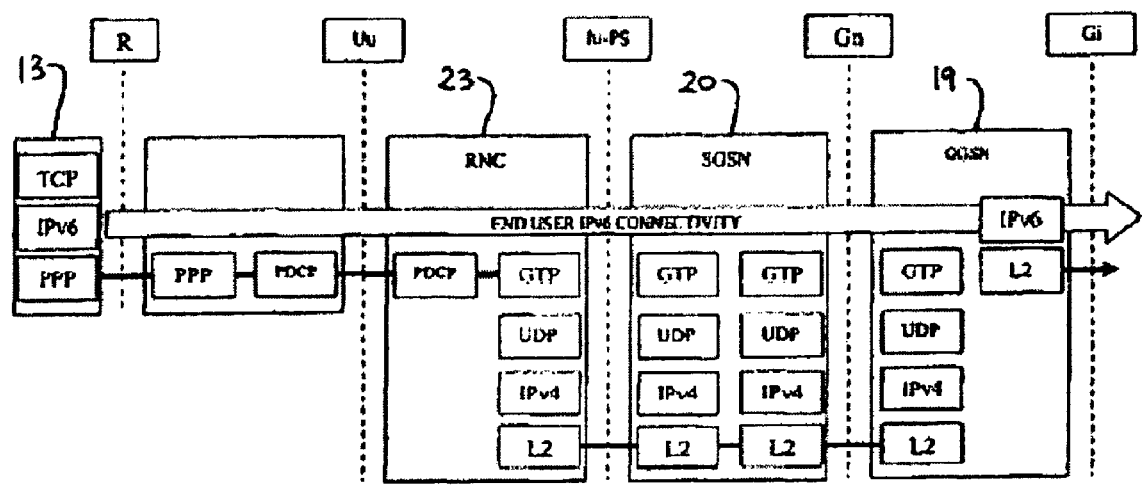
FIG. 4 is a schematic block diagram of the network layer connectivity provided by the UMTS network of FIGS. 1 and 2.

Referring to FIG. 4 the network layer connectivity provided by the UMTS packet-switched domain between a MMT 23 and the GGSN 19 is shown. In particular, the Packet Data Protocol (PDP) and the GPRS Tunnelling Protocol (GTP) support network layer connectivity between the MMT 13 and the GGSN 19. GTP operates such that the transport of network layer datagrams (e.g. IP or UDP packets) between the GGSN 19 and MMT 13 is handled at the link layer. Datagrams are only examined at the MMT 13 and GGSN 19. In particular the GGSN 19 assigns an IP address to the network layer interface of each MMT 13; when the MMT 13 starts a session with a correspondent node on a remote PDN, the MMT 13 uses its assigned IP address as the source address in IP packets. The GGSN 19 acts as a gateway router between all of the MMTs 27 of the UMTS network 11 and external PDNs such as the Internet. However, to route packets across the UMTS network 11 the GGSN does not rely on network layer routing mechanisms, but relies on PDP contexts established and maintained by the MMT 13, SGSN 20 and GGSN 19. In this way the UMTS network 11 is able to provide global layer 2 connectivity that can support any layer 3 protocol. It is to be noted that the MMT 13 is attached to the same GGSN 19 of its home network at all times (even whilst roaming outside the home network).

When the MMT 13 moves through the cells of the UMTS network 11 no change in IP address is necessary. This is because the GGSN 19 acts as a proxy on behalf of all IP addresses it has assigned to MMTs 27 within the network, and all IP traffic into and out of the UMTS network 11 passes through the GGSN 19. Thus movement of the MMTs 27 is transparent to the network layer. If a MMT 13 roams outside its home network, however, network layer connectivity is still supported by the same mechanism, albeit that the GGSN 19 will have to forward packets to a different GGSN that is part of another, possibly very distant, UMTS network.

Figure 5:
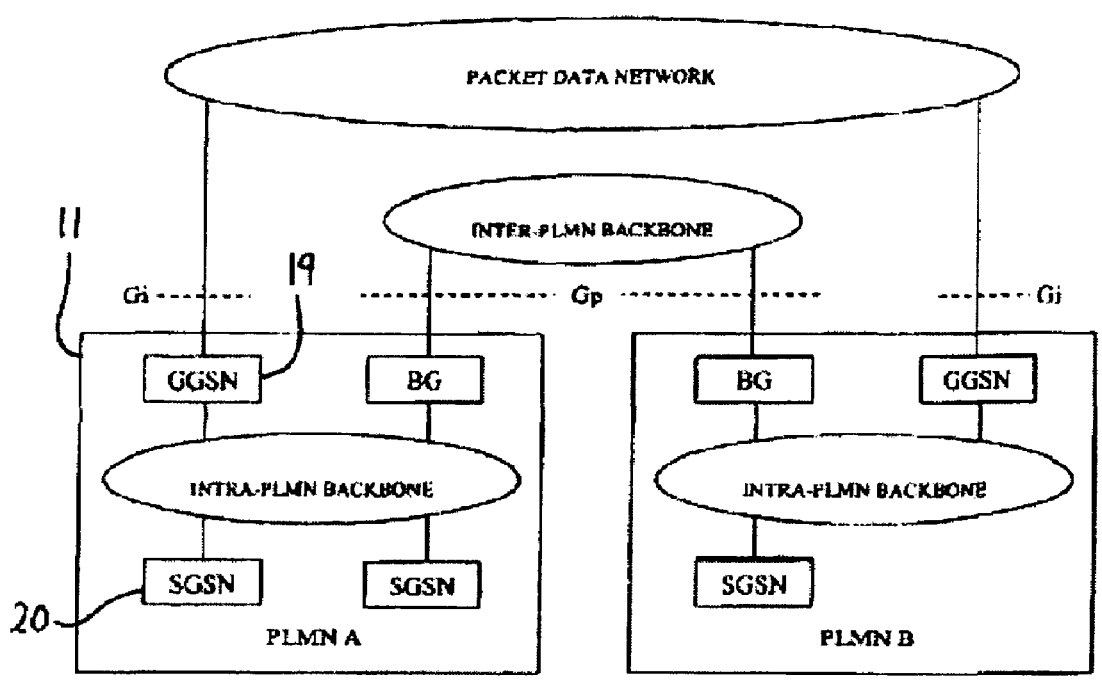
FIG. 5 is a schematic block diagram of the interconnection between two public land mobile networks.

Referring to FIG. 5 the interconnection of the UMTS network 11, shown as PLMN A, to a second PLMN (PLMN B) is illustrated. Each PLMN has an Intra-PLMN backbone that is a private IP network used for packet domain data and signalling within its corresponding PLMN only. PLMN A and PLMN B are interconnected by means of an Inter-PLMN backbone, another private IP network, and by means of a public PDN such as the Internet. The Inter-PLMN backbone connects the GGSN, SGSN and Intra-PLMN backbone of one PLMN with those of the other. As mentioned above, when the MMT 13 roams in PLMN B away from its home network, IP layer connectivity can be preserved in two ways:

(1) use the home network GGSN 19 to route IP packets via the inter-PLMN backbone, Border Gateways (BGs) and GTP tunnel over the Gp interface to the GGSN of PLMN B; or (2) use the GGSN of PLMN B to assign a new IP address to the network layer interface of MMT 13, whereby packets can be routed directly to and from the Internet by GGSN in PLMN B.

Scenario (1) hides movement of the MMT 13 from the network layer, but may not be able to provide the necessary quality of service if the GGSN in PLMN A is located in the UK and the GGSN in PLMN B is located the USA for example. Scenario (2) addresses this difficulty, but requires that support be given to mobility at the network layer; otherwise the MMT 13 will not be reachable from an IP address in the home domain.

Mobile IP can support mobility at the network layer. The Mobile Internet Protocol (i.e. Mobile IP) was designed to specifically handle the routing of IP data packets to and/or from mobile nodes (i.e. the MMTs 13 which roam in foreign networks and thereby change their point-of-attachment to the Internet). Moreover, Mobile IP was designed to handle the routing of IP data packets to and/or from mobile nodes without significantly interrupting on-going communications and without requiring mobile nodes to restart applications.

Mobile IP supports mobility, in part, by assigning two IP addresses to each MT. The first of these IP addresses is known as the "home" address i.e. that assigned by the GGSN 19 in the home domain. The home address is a permanent IP address, and it is associated with a MMT's home network. The second IP address is called the "care-of" address. The care-of-address is assigned to a MMT when it roams in a foreign network (as distinct from roaming in a foreign PLMN as described above). Unlike the MMT's home address, the care-of address is a temporary address. The care-of address is a temporary address because it changes whenever the MMT undergoes a handover procedure from one network to another, a so-called vertical handover.

Presently, there are two versions of Mobile IP that have been proposed by the Internet Engineering Task Force (IETF): Mobile IP version 4 (MIPv4), see RFC 3220 on www.ietf.org and Mobile IP version 6 (MIPv6), see RFC 3775. Briefly, Mobile (IPv4) works as follows in the context of UMTS networks. Whenever a MMT roams in a foreign network, and in so doing, attaches to the Internet through the GGSN of that foreign network (under option (2) above), the MMT informs the MMT's HA 26, as to its new care-of address. The HA 26 resides on the GGSN 19 of the UMTS network 11 i.e. the home network of the MMT 13.

The process involves sending the HA 26 both the current care-of-address and the home address. The process is also referred to as a registration or "binding update".

After the MMT registers its new care-of address with the HA 26, the HA 26 is able to serve as a proxy host for the MT. Accordingly, IP data packets addressed to the MMT (i.e., the MMT's home address) from a correspondent node will be intercepted by the HA 26. The HA 26 then encapsulates the IP data packet in another IP header that is addressed to the care-of address. The data packet is then sent from the HA 26 to the MMT's care-of address i.e. the foreign GGSN, over the Inter-PLMN backbone or the Internet. When the IP data packet arrives at the care-of address, the IP data packet is retransformed or de-capsulated by stripping away the care-of address so that the MMT's home address once again appears as the destination address. The IP data packet can then be delivered to the mobile node, wherein the data contained therein can be processed by the appropriate higher level protocols (e.g. TCP).

Figure 6:
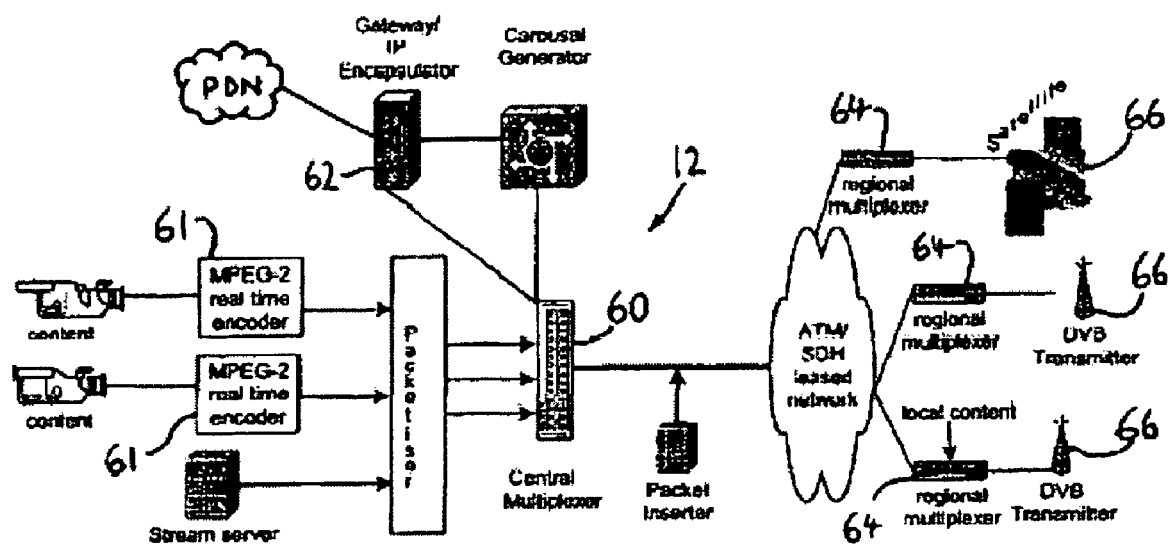
FIG. 6 is a schematic block diagram of a DVB network.

Referring to FIG. 6 the broadcast network 12 is shown in greater detail. In particular, it comprises a DVB network having a central multiplexer 60 that receives a number of separate inputs (for example audio, video, etc.) that are each encoded into a respective MPEG transport stream (MPEG-TS) with an MPEG-2 encoder 61. Data from an external PDN (e.g. Internet) may be multiplexed into the MPEG-TS by a DVB gateway 62, either as a separate channel or by exchanging stuffing packets in the MPEG-TS for packets containing data, e.g. IP packets. In particular the DVB gateway 62 operates by taking IP datagrams received from the external PDN and inserts them into DVB-TS packets according to the Multi Protocol Encapsulation (MPE) for example (see EN 301 192 at www.etsi.org). The multiplexed streams are transmitted over an ATM (Asynchronous Transfer Mode) or SDH (Synchronous Digital Hierarchy) network 63 to a number of regional multiplexers 64. The regional multiplexers 64 may multiplex further streams into that received from the central multiplexer 60. For example local news and weather content 65 may be multiplexed into the main MPEG-TS from the central multiplexer 60.

The regional multiplexers 64 forward the MPEG-TS to a DVB transmitter 66. DVB may be broadcast via a number of standards: DVB-S (satellite), DVB-T (terrestrial) and DVB-C (cable). The present invention is primarily concerned with distribution under the DVB-T standard i.e. from a number of fixed transmitters mounted some distance above the ground, although it is also applicable to any cellular broadcast standard such as DVB-S in which one or more satellite is used to transmit data to a specific area or a number of sectors on the earth's surface. Each transmitter 66 broadcasts data to a DVB cell i.e. a limited geographical area of coverage. Thus the DVB network can be considered "cellular".

Figure 7:
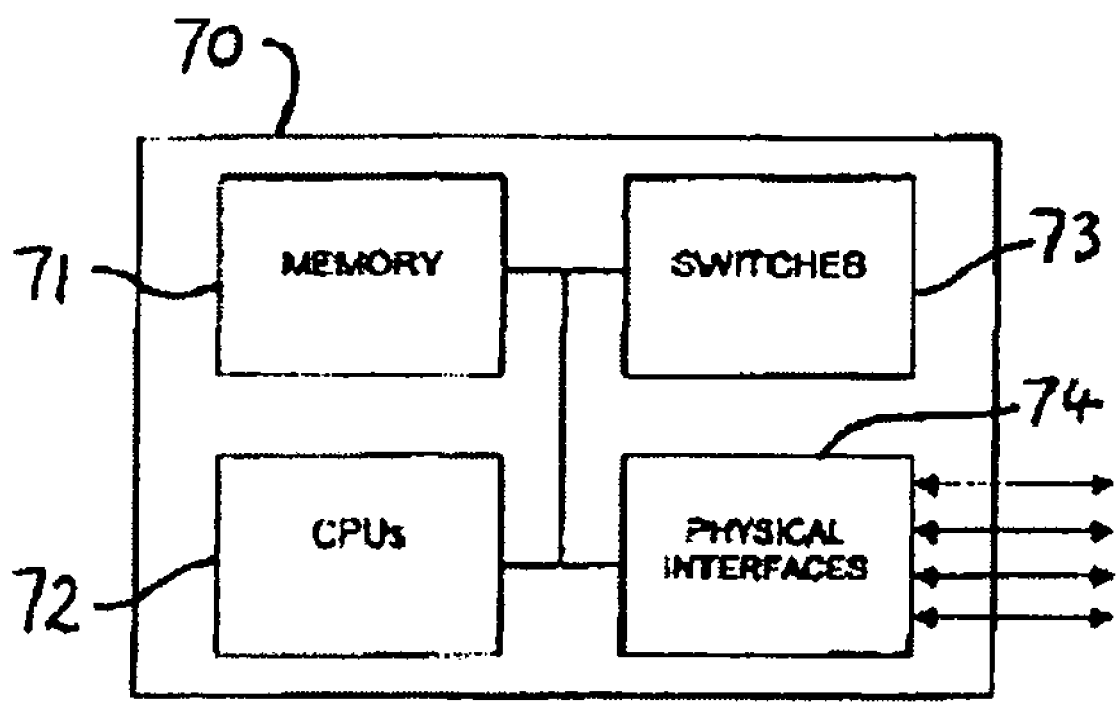
FIG. 7 is a schematic block diagram of a DVB gateway in the DVB network of FIG. 6.

Referring to FIG. 7 the DVB gateway 62 comprises a case 70 housing an electronic memory 71 (e.g. for example hard disk (e.g. solid state or magnetic disk), Random Access Memory (RAM), Read Only Memory (ROM)), one or more CPU 72, one or more switch 73, and one or more physical interface 74. All of these components are in electronic communication with one another. Each physical interface 74 is connected to a network such as an external PDN (e.g. the Internet), a WAN or LAN. One of the physical interfaces provides a connection for transfer of data to an interface on the UMTS network 11 described above.

In use, frames are received from the external PDN by a link layer protocol controller (not shown) that handles the link layer protocol (e.g. HDLC, Ethernet) used over the physical link. Frame integrity is checked and valid frames are converted into packets (e.g. IP packets) by removing the link layer header and, if necessary, the packets are queued in a queue stored in the memory 71. One packet at a time is removed from the queue by a network protocol-forwarding engine and is encapsulated in sub-network data unit and placed in the payload of a transport stream (TS) packet at the MPEG-2 level with an encapsulator (not shown). The TS packet is passed through the switch 73 to the appropriate physical interface 74 on the DVB network 11 and is transmitted as an MPEG-2 TS to the central multiplexer 60. In this way PDUs from external PDNs can be multiplexed into the main TS by the broadcast operator.

Figure 8:
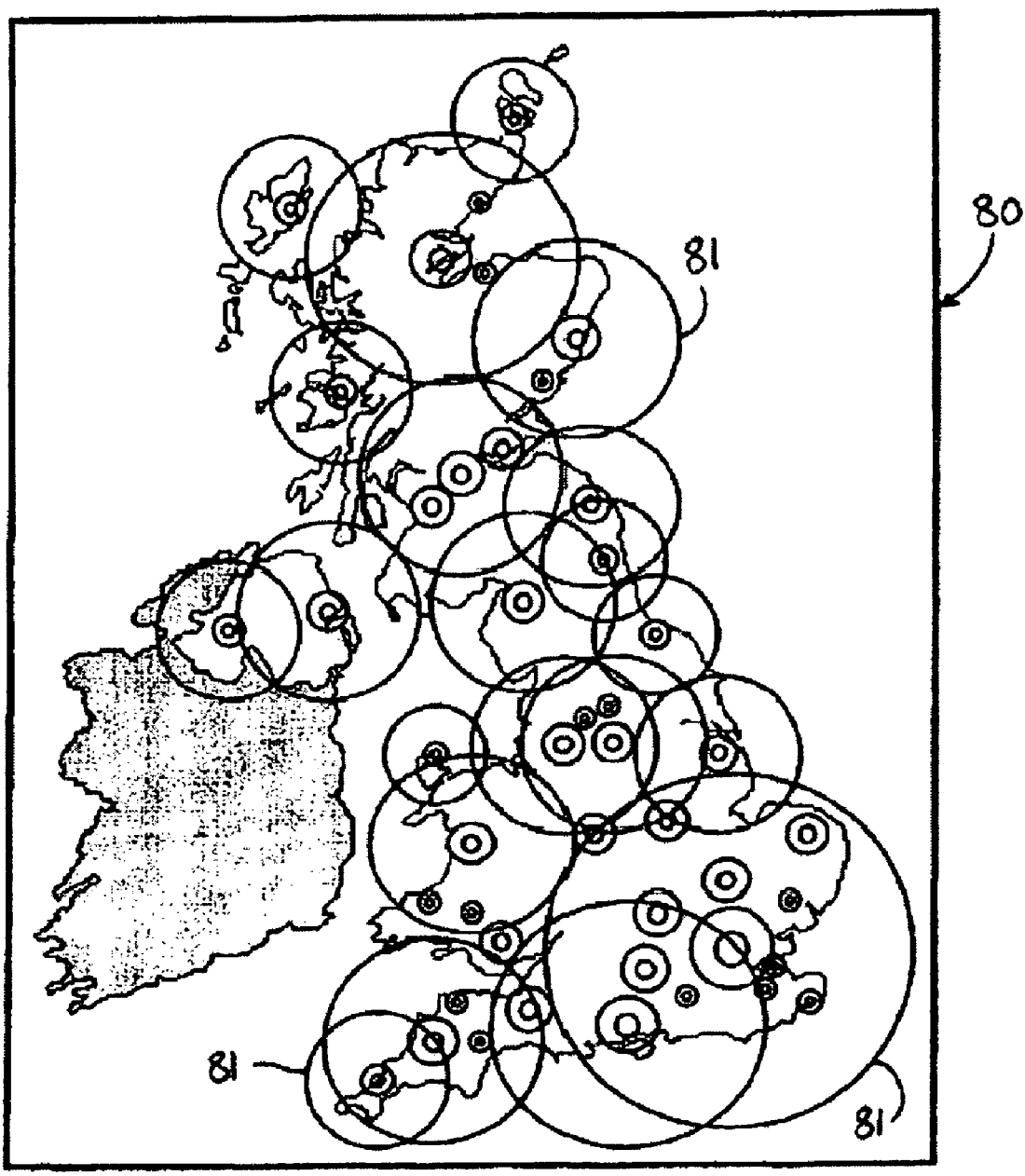
FIG. 8 is a schematic map of Great Britain showing how it may be divided into DVB cells.

Referring to FIG. 8 a map 80 of the United Kingdom illustrates how the population may be served by a number of DVB cells 81. Although each DVB cell 81 is idealised as providing coverage to a circular area, the actual coverage will be dependent on a large number of factors including geography, weather, etc. The range of DVB cell radii may be from hundreds of metres up to tens of kilometres. For example a large DVB cell may have a radius of about 80 km and a small DVB cell may have a radius of about 100 m. Smaller DVB cells may be provided within larger DVB cells where signal strength from the main transmitter is poor for example. Thus a broadcast operator may selectively broadcast content and/or data to a number of transmission regions or to individual cells. It is envisaged in future that a larger number of (smaller size) DVB cells will be provided to enable datagram delivery to mobile terminals using DVB-Handheld (DVB-H) for example.

Thus in the heterogeneous network environment 10 the multi-mode MMT 13 may receive packet data from a variety of different networks that overlay one another in terms of area of coverage: in general one DVB cell overlays several UMTS cells; one UMTS cell overlays a number of WLAN cells; and one WLAN cell overlays a number of Bluetooth piconets; although this need not be adhered to strictly.

Figure 9:
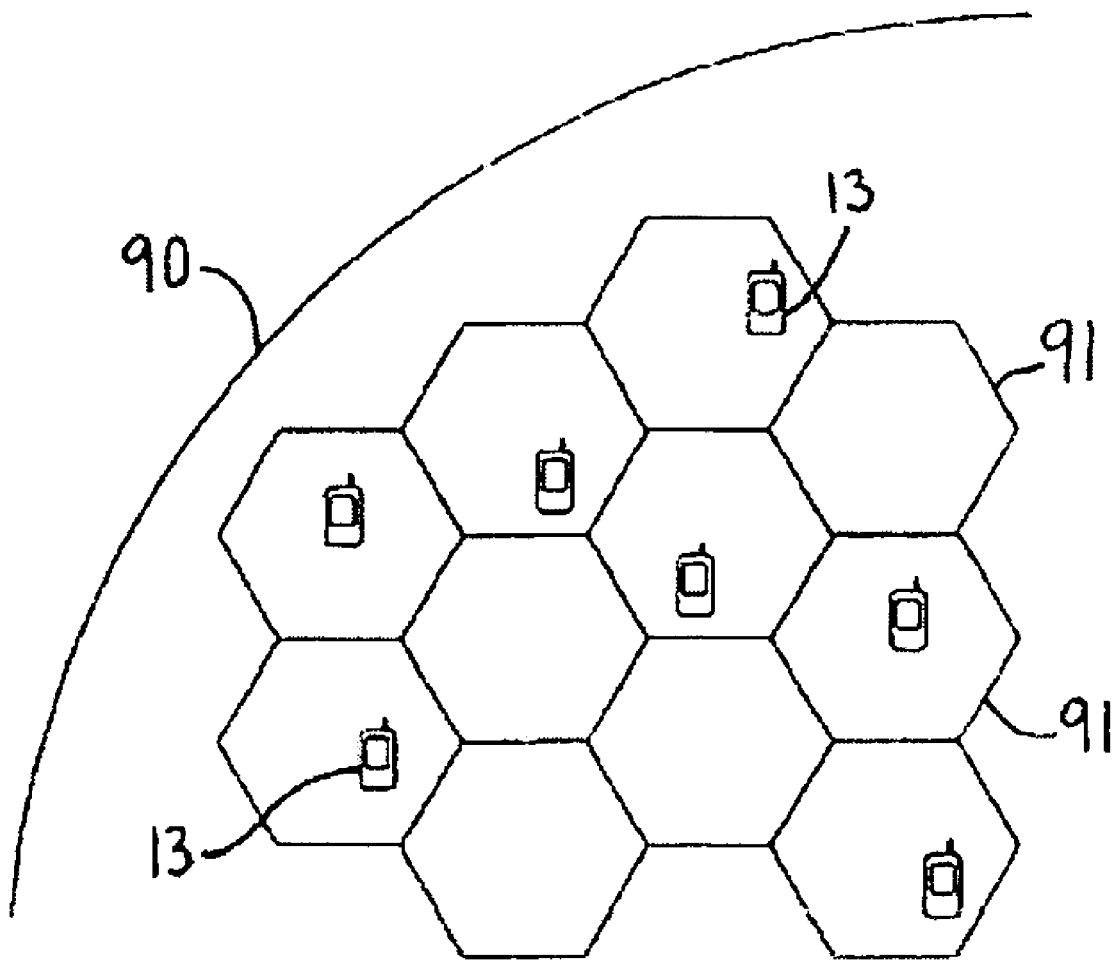
FIG. 9 is a schematic diagram of part of a DVB cell overlaying a number of UMTS cells with stationary mobile terminals therein.

Referring to FIG. 9 signal coverage provided by part of the heterogeneous network 10 comprises a DVB cell 90 (only part shown) that overlays a number of smaller UMTS cells 91. A number of MMTs 13 are located in different UMTS cells 91. Each user of each MMT 13 is static or in motion (e.g. walking, travelling in a car); for example, one user might be sitting in a cafe, another walking to work and another user might be waiting for a train. Each user uses the packet-switched domain provided by the UMTS network 11, for example browsing the Web and requesting a multimedia clip such as football highlights or a film trailer that might be delivered by Multimedia Broadcast/Multicast Service (MBMS). Although any movement within the UMTS network 11 is transparent to the network layer, each MMT 13 is Mobile IPv4 or IPv6 enabled.

It is very likely that a number of the users of the MMTs 13 would request the same service at the same time. For example each of the users might register to watch highlights of a football match, the highlights starting at a predetermined time in the future. It may not be efficient to unicast or multicast the highlights to all of these users via the UMTS network 11 particularly taking into account bandwidth restrictions on the wireless link between Node Bs and the MMTs 13. Thus it may be preferable to handover the MMTs 13 as a group from the UMTS network 11 and use the broadcast network 12 instead to deliver the requested service. However, a vertical handover of the MMTs 13 to the broadcast network 12 would result in a change in each of the MMT's reachability in the global Internet topology. Therefore each MMT 13 would be required to break ongoing TCP sessions for example and the signalling load on the UMTS network 11 would be high whilst Binding Updates were sent. Furthermore, although the broadcast network overlays the mobile network in terms of signal coverage, there is no co-operation between the two networks to facilitate handover. In particular there is no mapping between the DVB and UMTS cells so that the correct datagrams can be broadcast from the correct DVB transmitter.

Figure 10:
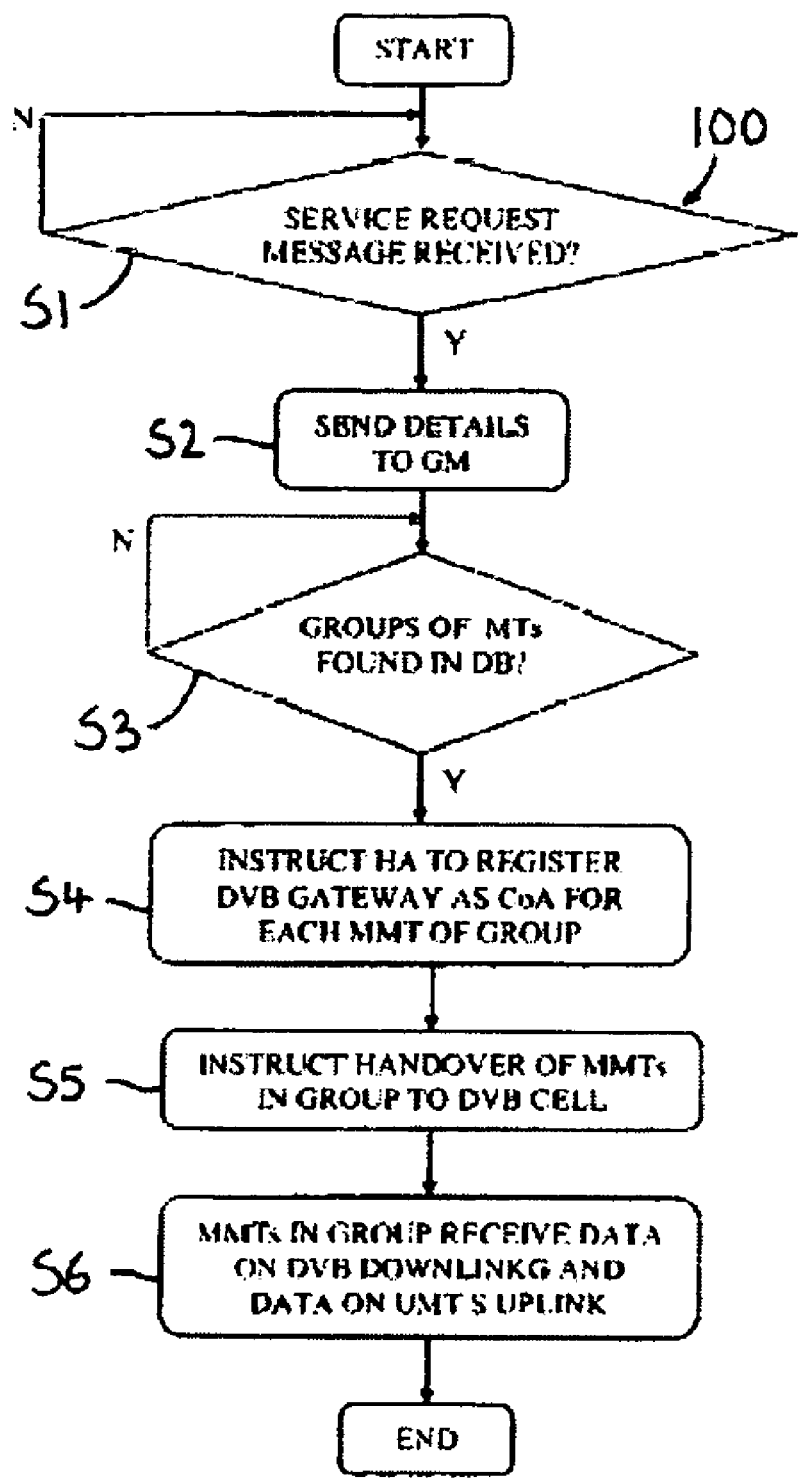
FIG. 10 is a flowchart showing steps in a group handover method in accordance with the present invention.

Referring to FIG. 10 a method for handing over the MMTs 13 as one group from the UMTS network 11 to the broadcast network 12 (i.e. vertical handover) is generally identified by reference numeral 100. At step S1 the UMTS network 11 awaits a service request message from MMTs, each service request message comprising data representing a foreign network indicator of each network (in this embodiment a Network ID) and a foreign location identifier or current cell location of that MMT (i.e. the particular cell ID) in each network to which it has access; it is to be noted that the MMT identity does not have to be transmitted as part of the service request message since this is already or will be available to the mobile network 11 (e.g PDP address). Service request messages are only sent when a MMT demands a new service that requires the resources of the packet-switched domain of the UMTS network 11, such as an on demand multimedia service (see further detail provided below in respect of FIG. 11); this is to avoid flooding the UMTS network with service request messages. At step S2 each service request message is routed to the Grouping Module 27 on the HLR 21 and the data extracted and stored in a database. For each MMT 13 the database maps MMT identity, a home network indicator (e.g. home Network ID), a home location identifier (e.g. cell ID) and zero or more foreign network indicator and foreign location identifier. At step S3 the database is searched to group MMTs according to their location in the broadcast network 12 (i.e. the network to which they are to be handed over). For example, referring again to FIG. 9, each of the MMTs 13 located in the UMTS cells 91 will be grouped into a single group since they have the same foreign location identifier i.e. are located within a single DVB cell 90 (a group may comprise just one MMT). It would also be possible for the GM 27 to further divide each group according to requested service for example. At step S4 the GM 27 instructs the HA 26 to register the network layer address (e.g. IP address) of an interface on the DVB gateway 62 as the care-of address of each of the MMTs 13 in the group. This is done using a network mapping database that provides a mapping between each Network ID (e.g. ONETID, SSID, SID) and a respective IP address of an interface on each network. The network operator constructs this database manually during configuration. Alternatively it may be possible for the various networks to advertise their IP address to the other networks. At step S5 the GM 27 then instructs the MMTs 13 in the group to handover to the DVB cell 90 and provides the frequency and Packet Identifier (PID) number(s) that the MMTs 13 should tune to. Following this, at step S6 IP packets from a correspondent node destined for the group of MMTs 13 reach the GGSN 19 where they are forwarded by the HA 26 to the care-of address of the DVB gateway 62. On reaching the DVB gateway 62 the IP packets, such as the aforementioned football highlights, are inserted into the MPEG-TS and broadcast from the DVB cell 90 as described above. Each MMT 13 may then filter the appropriate MPEG Logical Channel from TS Multiplex using the PID(s) and receive the requested service via the DVB interface.

A Network ID is assigned to each network operator. For example, cellular network operators have a unique System ID (SID) assigned to them by a government. In the UK the cellular network operator Vodafone has the SID 234 15. The network operator Orange has the SID 234 33. Further details of network operators all over the world are presently available at http://www.gsmworld.com/roaming/gsminfo/index.shtml. A WLAN has a Network ID called a Service Set Identifier (SSID) that is a 32 character unique identifier that differentiates one WLAN from another. A DVB network operator has an Original Network ID (ONETID) that serve as unique identification codes for DVB networks. Each DVB network transmits a Network Information Table (NIT) that carries dynamically updated network and transponder specific information (network name ID, frequencies, code rates etc.) for all transponders of the network. A NIT is transmitted every 10 s or less. For example a NIT transmitted from the transmitter at Crystal Palace, UK comprises the following:

| | |
|---|---|
| table_id | 0x40 |
| section_syntax_indicator | 1 |
| section length | 0x028a |
| id | 0x3005 |
| version number | 0x06 |
| current_next | 0x01 |
| section number | 0x00 |
| last section number | 0x00 |

Name descriptor:

| | |
|---|---|
| Crystal Palace ***** Transport Stream ****** | |
| TS ID | 0x1004 |
| Original Network ID | 0x233a |

Service List Descriptor:
Service ID 0x1044→Service Type 0x1 (DIGITAL_TV_SERVICE)
Service ID 0x1084→Service Type 0x1 (DIGITAL_TV_SERVICE)
Service ID 0x10ff→Service Type 0x1 (DIGITAL_TV_SERVICE)
Service ID 0x113f→Service Type 0x1 (DIGITAL_TV_SERVICE)
Service ID 0x117f→Service Type 0x1 (DIGITAL_TV_SERVICE)
Service ID 0x123f→Service Type 0x1 (DIGITAL_TV_SERVICE)

Terrestrial delivery system descriptor:

| | |
|---|---|
| Frequency | 50583333 |
| Bandwidth | BANDWIDTH_8_MHZ |
| Constellation | QAM_16 |
| Hierarchy | HIERARCHY_NONE |
| Code rate HP | FEC_2_3 |
| Code rate LP | FEC_2_3 |
| Guard interval | GUARD_INTERVAL_1_32 |
| Transmission | TRANSMISSION_MODE_2K |
| Other freq. | yes |

Frequency List Descriptor:
 Coding: TERRESTRIAL
 Frequency: 69783333
 FREQUENCY: 69016667
 Frequency: 55400000

Whatever the particular form of the Network ID it is usually broadcast by each network operator and is received and read by MMTs.

Figure 11:
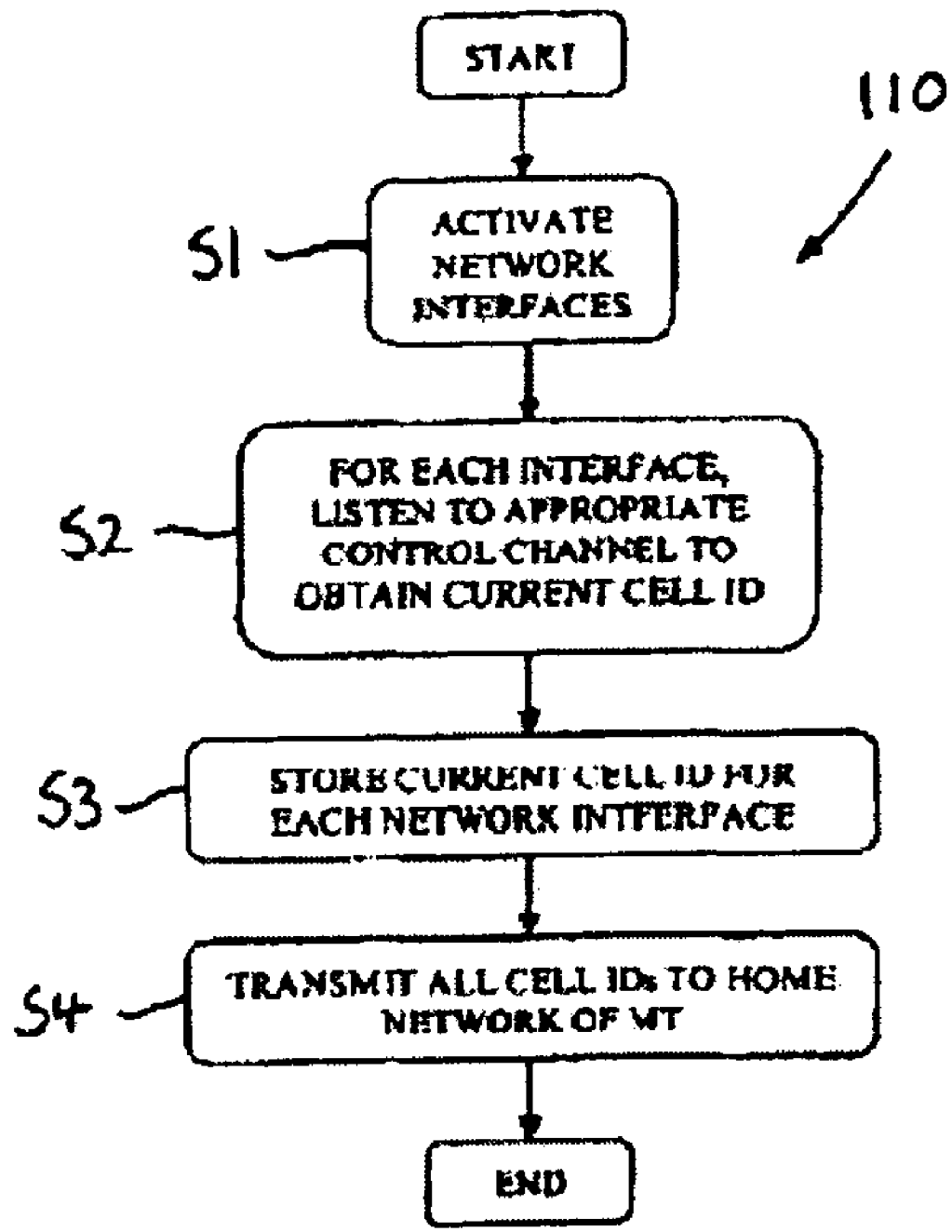
FIG. 11 is a flowchart showing steps in an interface and location gathering method performed by mobile terminals in accordance with the present invention.

Referring to FIG. 11 a method for gathering and transmitting foreign location identifier or cell ID data to the home network of the MMT 13 is generally identified by reference numeral 110. Computer executable instructions to execute this method may be provided in the form of a software update to each MMT 13 from the UMTS network 11. The method 110 is triggered when the user of the MMT 13 requests a service, such as opening a Web browsing application, which requires resources of the packet-switched domain of the UMTS network 11. At step S1 the MMT 13 activates its available network interfaces, apart from its home network interface: the UMTS network 11 in this case. The interfaces may be activated in series or in parallel depending on whether the MMT 13 has a single re-configurable interface (e.g. using software defined radio) or a number of distinct physical interfaces. For this particular example, the MMT 13 has two physical interfaces in addition to the UMTS interface: a WLAN interface and a DVB interface. When the WLAN interface is activated the MMT 13 listens for the foreign location identifier which in this case is the Service Set Identifier (SSID) broadcast by an Access Point of the WLAN at step S2. The SSID is stored in memory (e.g. RAM) of the MMT 13 whilst any other interfaces are activated. The MMT 13 then activates its DVB interface and listens to the necessary control channel from which it will receive the foreign location identifier which in this case is the DVB cell ID. Although current DVB standards do not specify cell identities to be broadcast by transmitters, it is very likely that future versions of DVB will. For example, DVB-Handheld (DVB-H) presently under discussion specifies that each DVB transmitter should broadcast a cell ID. Other information that the MMT 13 may receive from the UMTS network (assuming it is not the home network of the MMT 13) includes: network operator code; base station code; location area code; and mobile network code. If the foreign network is a DVB network, the information received may comprise the NIT.

Having stored in memory the foreign location identifier (current cell ID) and foreign network indicator (mobile network code) of each network to which the MMT 13 has access, the MMT 13 constructs a service request message to its home network to transfer this data. The service request message comprises the current cell ID and network ID (in this case the ONETID). The service request may be sent during PDP context setup or as a separate signalling procedure after a PDP context has been established. The service request message is routed over the UMTS network 11 where it is processed and stored in memory by the GM 27 as described above. The home location identifier which in this case is the UMTS cell ID is already known (or available) to the home network of the MMT 13, a primary PDP context having been established before (or just after) transmission of the service request; in this case it can simply be looked up in the HLR 21. If only the present location area is known, the GM 27 may instruct the GGSN 19 to page the MMT 13 to discover the current UMTS cell ID. The GM 27 now has a mapping between the MMT identity (already available to the mobile network 11), the current UMTS cell I (i.e. home location identifier), the cell ID of the DVB transmitter that can serve the MMT 13 in its present location, and a WLAN SSID that identifies the WLAN network that can serve the MMT 13 in its present location (i.e. the foreign network indicators and foreign location identifiers). The GM 27 can now look up the IP address (e.g. of the DVB gateway 62) on each network using the Network ID to obtain a routable network layer address to which it may forward data for the MMTs.

Figure 12:
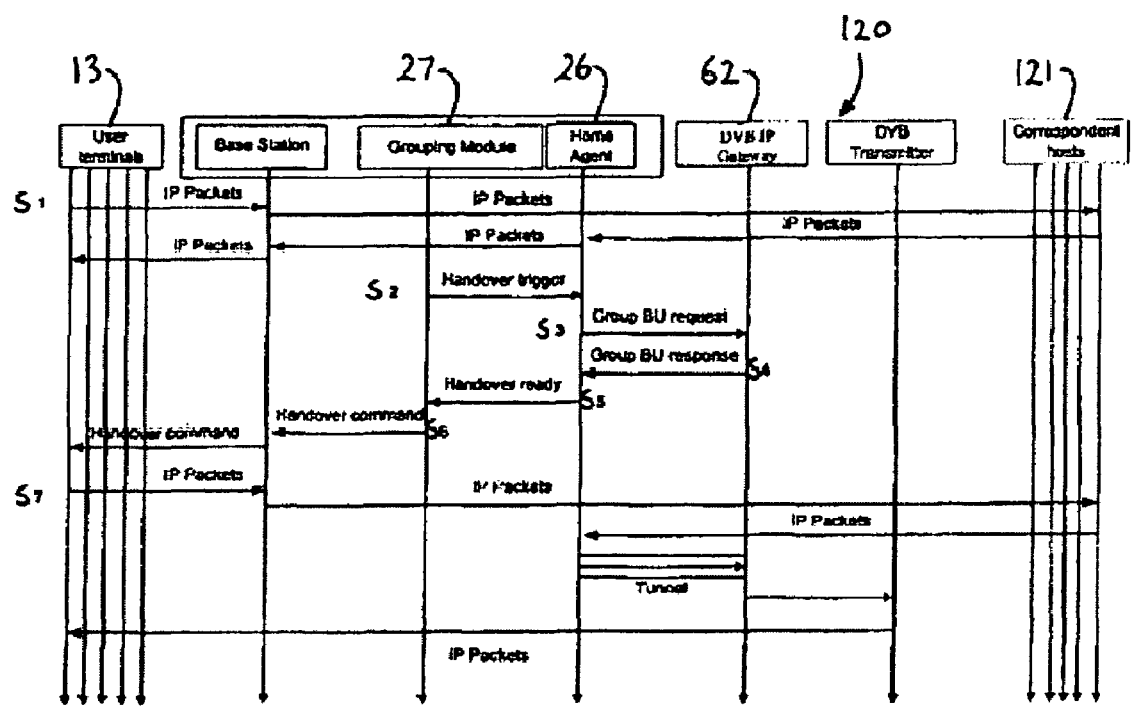
FIG. 12 is a schematic signalling diagram illustrating a group handover method in accordance with the present invention for handing over stationary mobile terminals.

Referring to FIG. 12 a signalling diagram generally identified by reference numeral 120 illustrates the method steps performed by the GM 27 to accomplish network handover of the group of MMTs 13, together with the paths of packet data before and after group handover. At step S1 IP packets originating from the MMTs 13 are handled as described above by the UMTS network 11, and are sent by the GGSN 19 for subsequent routing over the Internet to a one or more correspondent node (CN) 121. In the opposite direction all IP packets addressed to the MMTs 13 from the CN 121 are received by the GGSN 19 and routed as described above using GTP and PDP contexts. Each MMT 13 registers with the UMTS network 11 as described above, and data representing the current cell location of each MMT on each network is stored in memory by the GM 27 on the HLR 21. The GM 27 substantially continuously examines the database for MMT groups.

At step S2 the number of MMTs 13 in a given group may reach a predetermined threshold (or a predetermined amount of time may elapse since the group was first created) that triggers a group handover. The GM 27 sends a Handover Trigger message to the HA 26. The message contains IP addresses of the members of the group that should be registered with the DVB network 12. The HA 26 (stored on a first network node in this case the HLR 21) then constructs and sends a group handover request or Group Binding Update (GBU) message to the DVB gateway 62 (a second network node) at step S3. The GBU comprises, for each MMT 13 in the group, a first interface address, in this case the MMT IP address, and a second interface address, in this case the DVB MAC interface address; if handover is between the UMTS network 11 and a WLAN the GBU would comprise, for each member of the group, the MMT IP address and the care-of address assigned to the WLAN interface. On receiving the GBU, the DVB gateway 62 extracts all of the aforementioned data and stores that same in memory. If data is to be unicast to each MMT in the group this enables the DVB gateway 62 to map any IP packets to the MAC address of the DVB interface on the same MMT 13. However, if data is to be multicast to the group, this mapping step is not necessary. The DVB network 12 then assigns resources to the MMTs 13 including the necessary PIDs (if not already assigned). At step S4 the DVB gateway 62 constructs and transmits a Group Binding Acknowledgement (GBA) to the HA 26 that contains the PID that each MT 13 should tune to after handover. Having received the GBA, the HA 26 inserts each IP address into its binding cache and enters the same care-of address for all of the MMTs 13 that are in the group. This care-of address is the IP address of an interface on the DVB gateway 62. In this way all IP packets arriving at the GGSN 19 addressed to the MMTs 13 will be encapsulated in a new IP header addressed to the care-of address and forwarded thereto. The HA 26 is now ready to forward IP packets addressed to any MMT in the group using an IP header with a destination address of the DVB gateway 62. This establishes a tunnel between the HA 26 and the DVB gateway 62. The HA 26 also informs the GM 27 that it is now ready to forward packets to the DVB gateway 62 at step S5.

At step S6 the GM 27 informs the GGSN 19 that a group handover can commence. The message contains the IP addresses of the MMTs 13 in the group. The GGSN 19 can then look up the corresponding PDP contexts using the IP addresses and issue appropriate instructions to the MMTs to cease listening to the downlink frequency of the Node B and switch to a specified frequency and PID number using its DVB interface. Communication on the UMTS uplink can continue as normal with the Node B. All of the MMTs 13 in the group perform the handover as instructed, which will take place substantially simultaneously. The handover may be a hard handover i.e. each MMT 13 stops listening the Node B downlink before activating the DVB interface. However, a soft handover i.e. the MMT 13 activates the DVB interface before it stops listening to the Node B downlink, would be possible if a fast, reliable link exists between the GGSN 19 and DVB gateway 62 such as a dedicated physical link or a secure logical link using a Virtual Private Network (VPN) for example.

After handover IP packets sent by MMTs 13 in the group are transmitted on the uplink of the UMTS network 11 in the normal way and forwarded to the CN 121 by the GGSN 19 as described above. The CN 121 may reply with IP packets addressed to the individual IP address of each MMT 13 i.e. that assigned by the GGSN 19. On arriving at the GGSN 19 the HA 26 forwards IP packets addressed to any MMT 13 in the group toward the DVB gateway 62 using the aforementioned IP tunnel. IP packets arriving at the DVB gateway 62 are de-capsulated to reveal the IP header used by the CN 121. The DVB gateway 62 examines the IP address and looks up the assigned PID (and, if data is to be unicast, the MAC address of the corresponding DVB interface i.e. that DVB interface physically located in the same MMT 13). The IP packets for that MMT 13 may be multiplexed into the MPEG-TS as described above and broadcast from the correct DVB transmitter for reception by the MMT 13. Thus, the UMTS network 11 provides the uplink and the DVB network 12 provides the downlink. When delivery of data is complete, the tunnel between the GGSN 19 and the DVB gateway 62 is torn down and the MMTs of the group return can return to an idle state.

Figure 13:
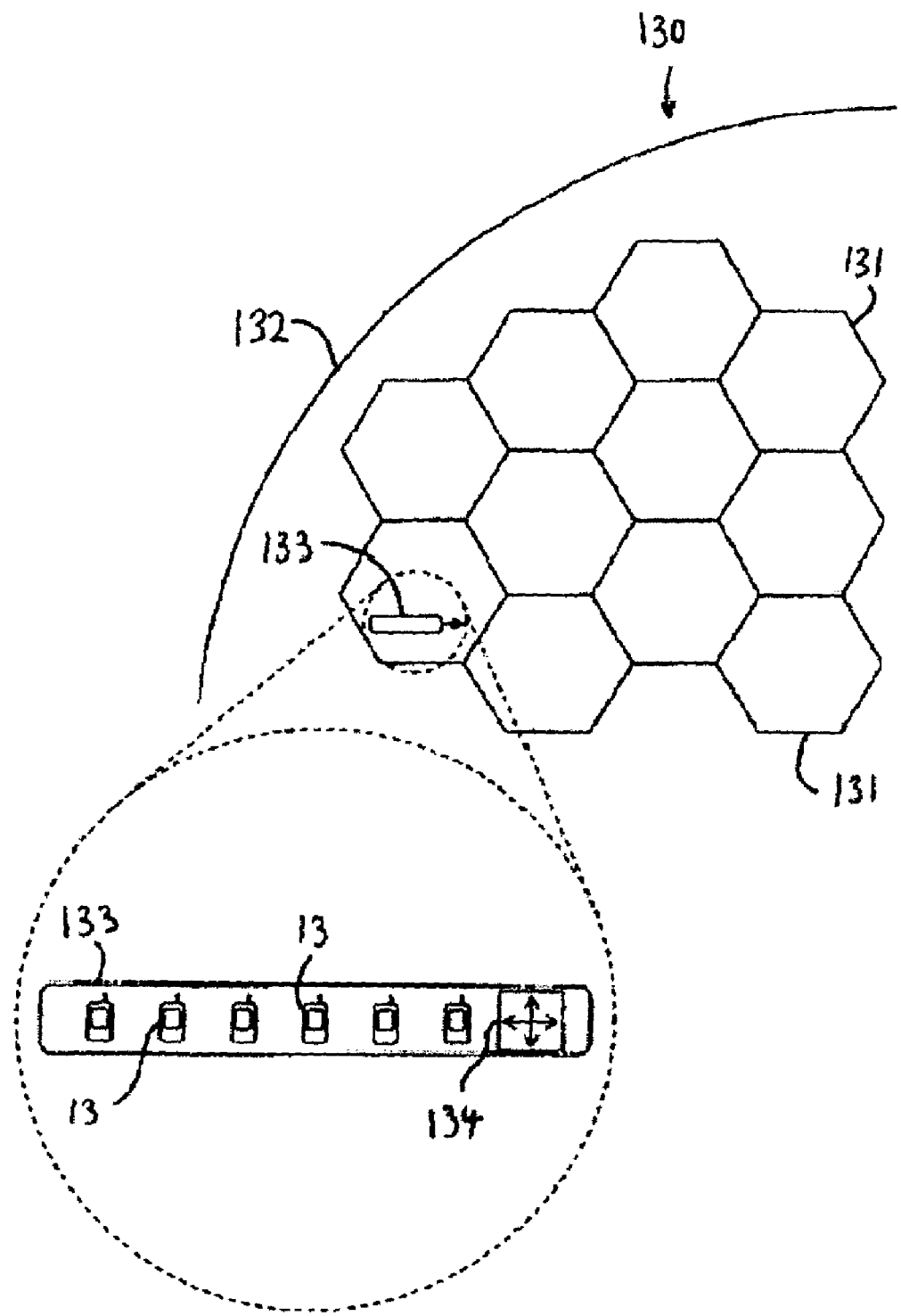
FIG. 13 is a schematic diagram of part of a UMTS cell overlaying a number of WLAN cells with moving mobile terminals therein.

Referring to FIG. 13 a second embodiment of a heterogeneous network environment generally identified by reference numeral 130 comprises a number of UMTS cells 131 overlaid by a DVB cell 132 (only part shown). In this embodiment users of the MMTs 13 are located on a train 133 that is moving through the area covered by the UMTS network 11. The MMTs 13 are therefore moving together with substantially the same speed and direction. The train comprises a Mobile Router (MR) 134 for use by those MMTs 13 that have a WLAN interface; however, some of the MMTs 13 in this embodiment do not have WLAN interfaces. Network layer handovers for all of the WLAN capable MMTs 13 are handled by the MR 134 as specified by NEMO (see <draft-ietf-nemo-basic-support-03.txt> at www.ietf.org/html.charters/nemo-charter.html for example); accordingly, movement of the train 133 is not apparent to the WLAN capable MMTs 13 under the MR 134. However, the MMTs 13 that do not have WLAN interfaces cannot use the services of the MR 134 and must use their UMTS interfaces to connect to the Internet as described above; accordingly, each of those MMTs 13 must undergo physical and link layer handovers as the train 133 passes through the UMTS cells 131 if sessions are to be maintained. Whilst it is not necessary for each of those MMTs 13 to change their IP address at each UMTS cell 131 handover, the high load placed on the UMTS network by the MMTs 13 on the train is undesirable, bearing in mind the limited bandwidth on the radio link. Accordingly, it would be beneficial if there were a mechanism of improving data transfer to the MMTs 13, and a way of vertical group handover of moving MMTs.

The MMTs 13 that do not have WLAN interfaces can be handed over as a group in a similar manner to that described above in connection with FIG. 12. However, it is necessary to specify some way of estimating which MMTs 13 in the UMTS network 11 are on the train 133 (i.e. moving together as opposed to those MMTs that are stationary and those that are moving randomly with respect to one another) and can therefore be defined as a group. To do this the GM 27 looks up and stores additional details about each of the MMTs. In particular, the GM 27 stores the following information about each MMT 13 in a location handover or cell history database in addition to the current cell ID (CID), n:

Time of handover to current CID
Previous CIDs and handover times, i.e.
  (n−1)th CID and (n−1)th handover time
  (n−2)th CID and (n−2)th handover time
  (n−3)th CID and (n−3)th handover time
  and so on.

The current cell ID is usually stored in the HLR or VLR for active MMTs that are currently in a session e.g. Web browsing session. For idle MMTs the HLR or VLR only stores the current paging area (i.e. a number of UMTS cells) in which the MMT is expected to be located. The GM 27 attempts to group only those MMTs that are in a session.

Figure 14:
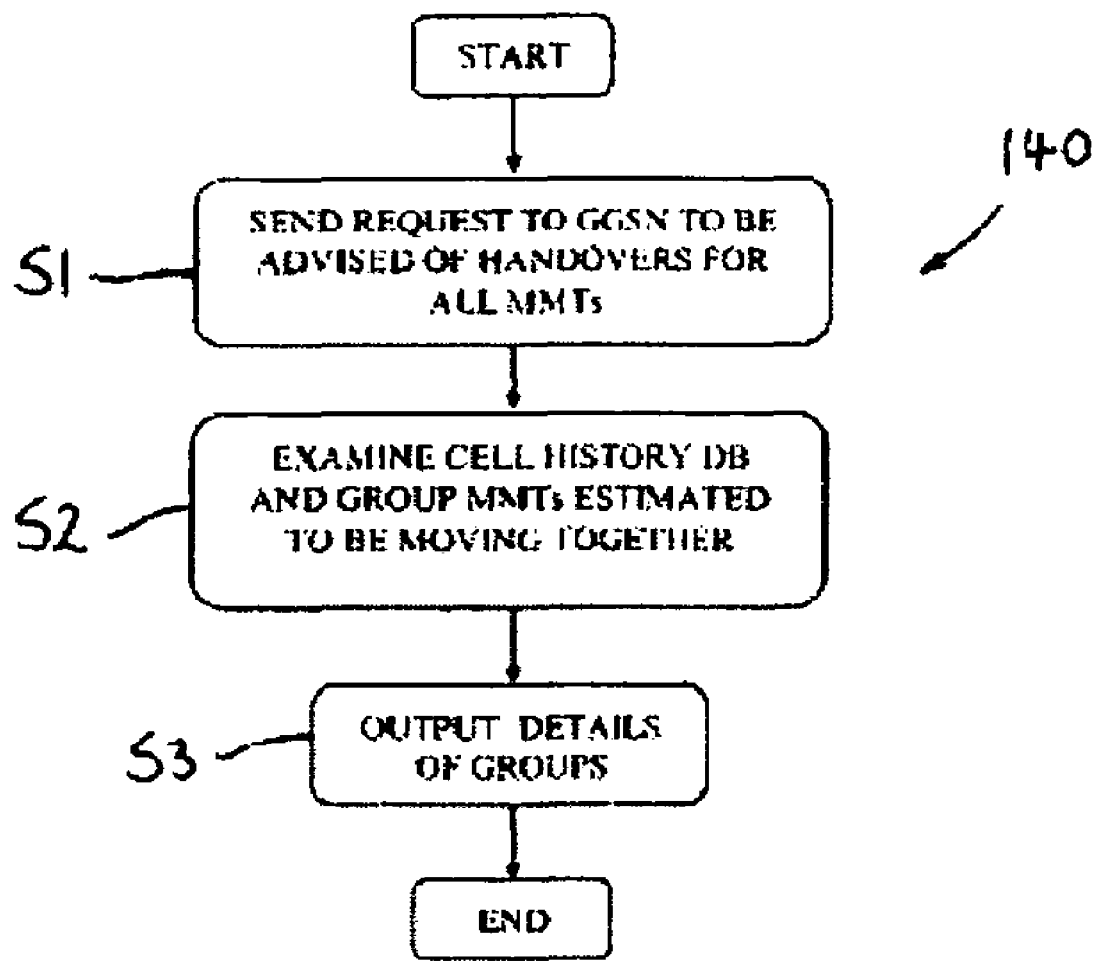
FIG. 14 is a schematic signalling diagram illustrating a group handover method in accordance with the present invention for handing over the moving mobile terminals of FIG. 13.

Referring to FIG. 14 a method of identifying MMTs 13 that are moving together in the UMTS network 11 is generally identified by reference numeral 140. The method 140 is carried out as step S3 of the method 100 shown in FIG. 10, and in connection with FIG. 12 replaces the step of grouping MMTs by location. At step S1, the GM 27 sends a request to the GGSN to be informed when each MMT undergoes handover and to be sent data comprising the old cell ID and new cell ID together with the time when handover was completed. Once the current cell history database has been populated and stored, the first MMT to undergo handover in the UMTS network triggers the GM 27 to search the aforementioned fields to determine (1) those MMTs that have the same cell handover histories over six previous CIDs (five cell handovers) and, for each handover, (2) whether or not all MMTs of the group undergo handover within a limited time period $T_H$. MMTs 13 that have the same cell history and in which each handover occurred for the entire group within the predetermined time are considered as a group. In other words the GM 27 performs the following steps: for the first handover, if all MMTs (of the group) were handed over within a time less than $T_H$ and between the same two cells; AND for the second handover, if all MMTs (of the group) were handed over within a time less than $T_H$ and between the same two cells; AND for the third handover, if all MMTs (of the group) were handed over within a time less than $T_H$ and between the same two cells; etc., then the MMTs are considered to form a group that is moving together. The grouping procedure is repeated each time any MMT undergoes handover in the UMTS network. This keeps the groups substantially up to date.

In this way MMTs 13 that move together and that do not have WLAN or equivalent capability can be grouped and handed over to the larger area of coverage provided by the DVB cell 132 whereby load-balancing may be facilitated for example. Furthermore, no special hardware needs to be installed on the train 133 to support the group handover mechanism as the MMTs 13 maintain direct communication with the UMTS network 11 (unlike NEMO for example where the MT would communicate with the MR 134). This is particularly advantageous as group handover benefits can be obtained with existing network infrastructure.

Figure 15:
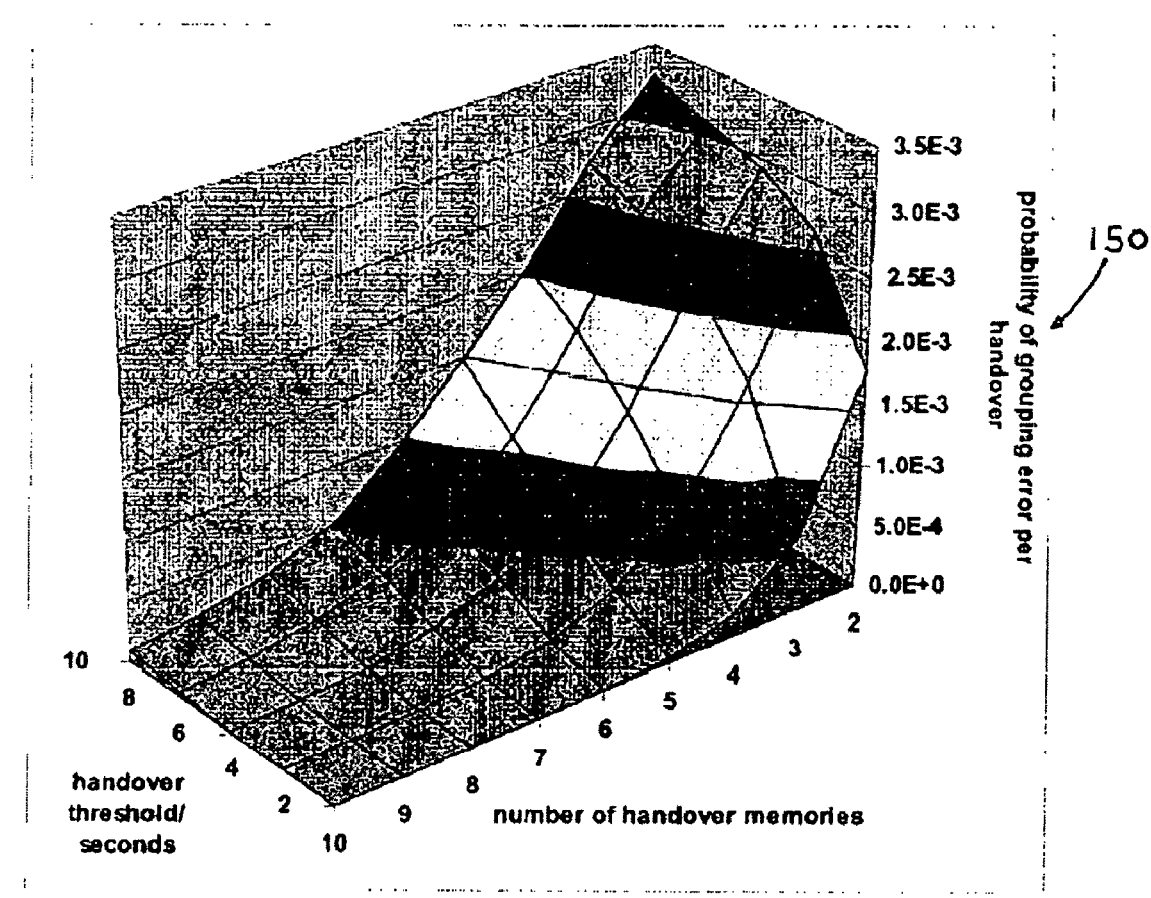
FIG. 15 is a graph illustrating results of a computer simulation of a simple hexagonal network used to test the group handover method of FIG. 14.

A simple hexagonal cellular network was simulated comprising 480 base stations, each separated from adjacent base stations by 200 m (~100 m cell radius). The network comprised 9600 MMTs in total (i.e. 20 MMTs on average per cell), of which 9,500 MMT were moving independently with Brownian motion i.e. approximately randomly. 100 of the 9600 MMTs were confined to a vehicle such as a bus or train, where mobility of these MMTs was based on a variation of the Reference Point Group Mobility RPGM Model (see X. Hong et al., "A Group Mobility Model for Ad Hoc Wireless Networks", *Proc. ACM/IEEE MSWiM*, Seattle, Wash., USA, 1999). Motion of the vehicle reference point was determined using a Markov model: the vehicle was accelerating, braking, at steady speed, stationary, or reducing speed to zero, with corresponding probabilities for state transitions. The one hundred MMTs in the vehicle moved with Brownian motion with respect to the vehicle's reference point, and were confined to being within the vehicle's radius of 10 m. The simulation was run and the time required to correctly identify and group the one hundred moving MMTs was determined as a function of the number of handover memories used and the handover threshold $T_H$. Referring to FIG. 15 a graph 150 shows the results of the simulation in terms of number of handovers (i.e. how many handovers each MMT must have in common) against the handover threshold, $T_H$, in seconds, against the probability of grouping error per handover. The probability of a grouping error can be seen to fall of quite quickly as the number of handover memories increases, with excellent results being obtained when there are at least six handovers and a handover threshold of less than six seconds. Clearly there is a balance to be struck in terms of network resources, but the graph serves to illustrate the rapid improvement in grouping accuracy as the number of handover memories is increased and handover threshold is decreased. Furthermore the size of the vehicle in which the MMTs reside may have a bearing on the duration of the handover threshold that the network operator selects. For example, passenger trains can be up to about 400 m in length; accordingly not all MMTs may be ready for handover at the same time, and therefore the window of time in which handover can be expected will be larger. The network operator will be able to adjust $T_H$ with this in mind during network configuration.

Whilst the specific embodiments have been described in relation to a UMTS network and a DVB network it will be appreciated that the invention is not limited to the specific examples: it is applicable to any mobile network and any broadcast/datacast network and/or any wireless network. In particular, the invention may be applied to handover groups of terminals intra-system and inter-system. For example, intra-system handovers include:

handovers to and from WLANs as MMTs move between locations;
handovers of other smaller-scale mobile networks, such as Body Area Networks (BANs) or Personal Area Networks, as they move between access point types e.g. Bluetooth, 802.11a/b/g, HIPERLAN;
any handovers between different access networks having similar access technology;
handover of mobile nodes between Internet gateway routers in an ad-hoc environment.
Examples of inter-system handovers include:
group handover from relatively high date rate, low spatial coverage provided by a first network e.g. WLAN, to a second network having great spatial coverage than the first e.g. DVB/UMTS;
vertical handovers between different network types for facilitating Internetworking of Networks (IoN) services;
vertical handovers between different network types as a stage in the process of reconfiguration of a MT; such an application might find particular use in software-defined radio for example.

Although the preferred embodiment has been described in the context of Mobile IP, it will be appreciated that the use of Mobile IP is not essential. Any suitable mechanism can be used to route packet data arriving at the GGSN 19 to the DVB gateway 62, such as Session Initiation Protocol (SIP).

Although the embodiments of the invention described with reference to the drawings comprises computer apparatus and methods performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the methods according to the invention. The carrier may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal that may be conveyed via electrical or optical cable or by radio or other means.

When the program is embodied in a signal that may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant methods.

We claim:

1. A method of discovering multi-mode mobile terminals in a heterogeneous network environment, each multi-mode mobile terminal having at least one interface for sending packet data to and/or receiving packet data from a home radio communication network and a foreign radio communication network, said home radio communication network having a different access technology from said foreign radio communication network, each multi-mode mobile terminal performing the steps of:
   (a) listening to said foreign radio communication network;
   (b) receiving and storing a foreign network indicator for indicating presence of said foreign radio communication network; and
   (c) transmitting said foreign network indicator to said home radio communication network;
   whereby said home radio communication network may store a database comprising a mapping between a multi-mode mobile terminal identity, a home network indicator and a foreign network indicator, to facilitate interworking of said home and foreign radio communication networks.

2. The method according to claim 1, wherein each multi-mode mobile terminal further performs the steps of receiving and storing a foreign location identifier representing its most recent location in said foreign radio communication network, and transmits said foreign location identifier to said home radio communication network, whereby for each multi-mode mobile terminal said home radio communication network may store a mapping between said foreign location identifier and a home location identifier representing its most recent location in said home radio communication network.

3. The method according to claim 2, each multi-mode mobile terminal further performing the step of transmitting said foreign location identifier to said home radio communication network following a change in location within said foreign radio communication network, whereby said home radio communication network may be kept substantially up to date with the location of each multi-mode mobile terminal in said foreign radio communication network.

4. The method according to claim 2, further comprising the step of storing a location handover history in said database for each multi-mode mobile terminal, said location handover history comprising the home location identifier of a location where each multi-mode mobile terminal was previously located.

5. The method according to claim 4, further comprising the step of storing at least five previous home location identifiers for each multi-mode mobile terminal.

6. The method according to claim 4, wherein said location handover history comprises for each multi-mode mobile terminal a time of handover between each location.

7. The method according to claim 1, further comprising the step of using said database to handover service of at least one of said multi-mode mobile terminals from said home radio communication network to said foreign radio communication network.

8. The method according to claim 1, further comprising the step of determining at least one group of multi-mode mobile terminals in said database, said determination based on those multi mode mobile terminals that have the same foreign network indicator.

9. The method according to claim 2, further comprising the step of determining at least one group of multi-mode mobile terminals in said database, said determination based on those multi mode mobile terminals that have the same foreign location identifier.

10. The method according to claim 4, further comprising the step of determining at least one group of multi-mode mobile terminals in said database, said determination based on those multi-mode terminals that have the same location handover history over the previous n location handovers, where n is greater than or equal to one.

11. The method according to claim 10, where n is at least five.

12. The method according to claim 10, further comprising the steps of, for each handover in said location handover history, determining those multi-mode mobile terminals that were handed over within a limited time period, only those multi-mode mobile terminals that have the same location handover history and that were handed over within said limited time period at each handover forming said at least one group.

13. The method according to claim 12, wherein for a simple hexagonal cellular network with handovers triggered by Euclidean distances to base stations, said time period is less than about six seconds.

14. The method according to claim 1, wherein said home radio communication network has access to a database comprising a mapping between said foreign network indicator and a network layer address, the method further comprising the step of querying said database using said foreign network indicator to discover said network layer address, which network layer address provides a way for said home radio communication network to communicate substantially directly or indirectly with said foreign radio communication network.

15. The method according to claim 8, further comprising the step of handing over service from said home radio communication network to said foreign radio communication network for multi-mode mobile terminals of said at least one group.

16. The method according to claim 15, wherein said handover step comprises the step of handing over a downlink only, whereby each multi-mode terminal of said at least one group uses an uplink of said home radio communication network and a downlink of said foreign radio communication network.

17. The method according to claim 15, further comprising the step of said home radio communication network instructing multi-mode mobile terminals in said at least one group to relinquish communication therewith and to commence communication with said foreign radio communication network.

18. The method according to claim 17, wherein said instructing step comprises the step of transmitting data with an instruction to enable each multi-mode mobile terminal to tune to the correct frequency and channel of the foreign radio communication network.

19. The method according to claim 15, further comprising the step of forwarding data packets arriving at said home radio communication network to said foreign radio communication network.

20. The method according to claim 15, further comprising the step of a first network node in said home radio communication network transmitting a group handover request message to a second network node on said foreign radio communication network, which group handover request comprises for each multi-mode mobile terminal in said at least one group: a first address of an interface for accessing said home radio communication network and a second address of an interface for accessing said foreign radio communication network, whereby said foreign radio communication network may store a mapping between an identity of each multi-mode mobile terminal and said two interfaces to facilitate routing of data packets arriving on said foreign radio communication network addressed to said first address.

21. The method according to claim 20, further comprising the step of said foreign radio communication network storing a database comprising said mapping.

22. The method according to claim 1, wherein steps (a), (b) and (c) are triggered when a multi-mode mobile terminal initiates a service.

23. The method according to claim 1, wherein said foreign network indicator comprises a network identifier of said foreign radio communication network.

24. The method according to claim 1, wherein said home radio communication network and said foreign radio communication network are both cellular in terms of coverage, each cell of said home radio communication network having a physical area of coverage less than each cell of said foreign radio communication network.

25. A home radio communication network in a heterogeneous network environment, which home radio communication network employs method of discovering multi-mode mobile terminals, each multi-mode mobile terminal having at least one interface for sending packet data to and/or receiving packet data from said home radio communication network and a foreign radio communication network, said home radio communication network having a different access technology from said foreign radio communication network, each multi-mode mobile terminal performing the steps of:
   (a) listening to said foreign radio communication network;
   (b) receiving and storing a foreign network indicator for indicating presence of said foreign radio communication network; and
   (c) transmitting said foreign network indicator to said home radio communication network;
   said home radio communication network comprising a network node having a memory storing computer executable instructions that when executed cause said home radio communication network to store a database comprising a mapping between a multi-mode mobile terminal identity, a home network indicator and a foreign network indicator, to facilitate interworking of said home and foreign radio communication networks.

26. A computer program for use in a method of discovering multi-mode mobile terminals in a heterogeneous network environment, each multi-mode mobile terminal having at least one interface for sending packet data to and/or receiving packet data from a home radio communication network and a foreign radio communication network, said home radio communication network having a different access technology from said foreign radio communication network, each multi-mode mobile terminal performing the steps of:
   (a) listening to said foreign radio communication network;
   (b) receiving and storing a foreign network indicator for indicating presence of said foreign radio communication network; and (c) transmitting said foreign network indicator to said home radio communication network;

said computer program comprising computer executable instructions for causing said home radio communication network to store a database comprising a mapping between a multi-mode mobile terminal identity, a home network indicator and a foreign network indicator, to facilitate interworking of said home and foreign radio communication networks.

27. A computer program for use in a method of discovering multi-mode mobile terminals in a heterogeneous network environment, each multi-mode mobile terminal having at least one interface for sending packet data to and/or receiving packet data from a home radio communication network and a foreign radio communication network, said home radio communication network having a different access technology from said foreign radio communication network, each multi-mode mobile terminal performing the steps of:

(a) listening to said foreign radio communication network;
(b) receiving and storing a foreign network indicator for indicating presence of said foreign radio communication network;
(c) transmitting said foreign network indicator to said home radio communication network;
(d) a first network node in said home radio communication network transmitting a group handover request message to a second network node on said foreign radio communication network, which group handover request comprises for each multi-mode mobile terminal in said at least one group: a first address of an interface for accessing said home radio communication network and a second address of an interface for accessing said foreign radio communication network, said computer program comprising computer executable instructions for causing a foreign radio communication network to store a mapping between an identity of each multi-mode mobile terminal and said two interfaces to facilitate routing of data packets arriving on said foreign radio communication network addressed to said first address.

28. A multi-mode mobile terminal for use in a method of discovering multi-mode mobile terminals in a heterogeneous network environment, said multi-mode mobile terminal having at least one interface for sending packet data to and/or receiving packet data from a home radio communication network and a foreign radio communication network, said home radio communication network having a different access technology from said foreign radio communication network, said multi-mode mobile terminal comprising a memory storing computer executable instructions for performing the steps of:

(a) listening to said foreign radio communication network;
(b) receiving and storing a foreign network indicator for indicating presence of said foreign radio communication network; and
(c) transmitting said foreign network indicator to said home radio communication network.

* * * * *